United States Patent
Kuno et al.

(10) Patent No.: US 12,291,603 B2
(45) Date of Patent: May 6, 2025

(54) ADDITIVE MANUFACTURING EMPLOYING SOLVENT-FREE POLYIMIDE-CONTAINING FORMULATIONS

(71) Applicant: Stratasys Ltd., Rehovot (IL)

(72) Inventors: Lev Kuno, Tzur-Hadassah (IL); Mariana Pokrass, Rehovot (IL); Elena Shpayzer, Rehovot (IL)

(73) Assignee: Stratasys Ltd., Rehovot (IL)

( * ) Notice: Subject to any disclaimer, the term of this patent is extended or adjusted under 35 U.S.C. 154(b) by 432 days.

(21) Appl. No.: 16/958,169

(22) PCT Filed: Dec. 27, 2018

(86) PCT No.: PCT/IL2018/051403
§ 371 (c)(1),
(2) Date: Jun. 26, 2020

(87) PCT Pub. No.: WO2019/130312
PCT Pub. Date: Jul. 4, 2019

(65) Prior Publication Data
US 2021/0070941 A1  Mar. 11, 2021

Related U.S. Application Data

(60) Provisional application No. 62/610,984, filed on Dec. 28, 2017.

(51) Int. Cl.
*B29C 64/00* (2017.01)
*B29C 64/112* (2017.01)
(Continued)

(52) U.S. Cl.
CPC .......... *C08G 73/128* (2013.01); *B29C 64/112* (2017.08); *B33Y 10/00* (2014.12);
(Continued)

(58) Field of Classification Search
CPC ...... C08G 73/128; B33Y 10/00; B33Y 70/00; B29C 64/112; B29K 2079/08; B29K 2105/0002
See application file for complete search history.

(56) References Cited

U.S. PATENT DOCUMENTS 4,812,511 A * 3/1989 Domeier ............... C08L 79/085
524/495
6,259,962 B1   7/2001 Gothait
(Continued)

FOREIGN PATENT DOCUMENTS

EP   1344789   9/2003
EP   1857478   9/2009
(Continued)

OTHER PUBLICATIONS

Fan, S.L., Boey, F.Y.C. and Abadie, M.J.M., 2007. UV curing of a liquid based bismaleimide-containing polymer system. Exp Polym Lett, 1, pp. 397-405. (Year: 2007).*
(Continued)

*Primary Examiner* — Nicholas R Krasnow

(57) ABSTRACT

Formulations usable in additive manufacturing, 3D inkjet printing in particular, of a three-dimensional object that contains a polyimide material, and additive manufacturing utilizing same are provided. The formulations contain a polyimide precursor (e.g., a bismaleimide) and an additional curable material, which is a multifunctional curable material, and are devoid of an organic solvent.

15 Claims, 5 Drawing Sheets

(51) Int. Cl.
   *B33Y 10/00* (2015.01)
   *B33Y 70/00* (2020.01)
   *C08G 73/12* (2006.01)
   *B29K 79/00* (2006.01)
   *B29K 105/00* (2006.01)

(52) U.S. Cl.
   CPC .......... *B33Y 70/00* (2014.12); *B29K 2079/08* (2013.01); *B29K 2105/0002* (2013.01)

(56) References Cited

U.S. PATENT DOCUMENTS

| | | | |
|---|---|---|---|
| 6,569,373 | B2 | 5/2003 | Napandensky |
| 6,658,314 | B1 | 12/2003 | Gothait |
| 6,850,334 | B1 | 2/2005 | Gothait |
| 7,300,619 | B2 | 1/2007 | Napadensky et al. |
| 7,183,335 | B2 | 2/2007 | Napadensky |
| 7,209,797 | B2 | 4/2007 | Kritchman et al. |
| 7,225,045 | B2 | 5/2007 | Gothait et al. |
| 7,479,510 | B2 | 1/2009 | Napadensky et al. |
| 7,500,846 | B2 | 3/2009 | Eshed et al. |
| 7,962,237 | B2 | 6/2011 | Kritchman |
| 9,031,680 | B2 | 5/2015 | Napadensky |
| 9,227,365 | B2 | 1/2016 | Dikovsky et al. |
| 2006/0111807 | A1 | 5/2006 | Gothait et al. |
| 2006/0116476 | A1* | 6/2006 | Cheng .................. C08F 222/40 525/120 |
| 2007/0270568 | A1 | 11/2007 | Ushiki et al. |
| 2010/0191360 | A1 | 7/2010 | Napadensky |
| 2015/0337147 | A1* | 11/2015 | Mayo .................. C09D 11/30 264/129 |
| 2017/0100817 | A1 | 4/2017 | Ganapathiappan et al. |
| 2017/0203508 | A1 | 7/2017 | Dikovsky |
| 2017/0319746 | A1 | 11/2017 | Lutolf et al. |
| 2018/0147773 | A1 | 5/2018 | Kalyanaraman |
| 2019/0127599 | A1 | 5/2019 | Chen et al. |
| 2020/0062952 | A1 | 2/2020 | Nguyen |
| 2020/0283548 | A1* | 9/2020 | Stansbury ......... C08F 220/1811 |
| 2021/0008793 | A1 | 1/2021 | Pokrass et al. |

FOREIGN PATENT DOCUMENTS

| | | | |
|---|---|---|---|
| EP | 2277686 | | 1/2011 |
| JP | 2008-13772 | | 1/2008 |
| JP | 2012-140582 | | 7/2012 |
| WO | WO 2016/151586 | | 9/2016 |
| WO | WO 2016/193933 | | 12/2016 |
| WO | WO 2016/193934 | | 12/2016 |
| WO | WO-2016193933 | A1 * | 12/2016 .......... B29C 64/106 |
| WO | WO 2017/019374 | | 2/2017 |
| WO | WO 2017/027482 | | 2/2017 |
| WO | WO 2018/011674 | | 1/2018 |
| WO | WO 2019/130310 | | 7/2019 |
| WO | WO 2019/130312 | | 7/2019 |

OTHER PUBLICATIONS

Official Action Dated Jan. 6, 2023 From the US Patent and Trademark Office Re. U.S. Appl. No. 16/958,713. (30 Pages).
Restriction Official Action Dated Sep. 16, 2022 From the US Patent and Trademark Office Re. U.S. Appl. No. 16/958,713. (10 Pages).
Communication Pursuant to Article 94(3) EPC Dated May 2, 2022 From the European Patent Office Re. Application No. 18836916.9. (6 Pages).
Communication Pursuant to Article 94(3) EPC Dated Sep. 14, 2021 From the European Patent Office Re. Application No. 18836915.1. (6 Pages).
International Preliminary Report on Patentability Dated Jul. 9, 2020 From the International Bureau of WIPO Re. Application No. PCT/IL2018/051401. (9 Pages).
International Preliminary Report on Patentability Dated Jul. 9, 2020 From the International Bureau of WIPO Re. Application No. PCT/IL2018/051403. (14 Pages).
International Search Report and the Written Opinion Dated Sep. 2, 2019 From the International Searching Authority Re. Application No. PCT/IL2018/051403. (21 Pages).
International Search Report and the Written Opinion Dated May 6, 2019 From the International Searching Authority Re. Application No. PCT/IL2018/051401. (14 Pages).
Invitation to Pay Additional Fees, Communication Relating to the Result of the Partial International Search and the Provisional Opinion Dated Jul. 8, 2019 From the International Searching Authority Re. Application No. PCT/IL2018/051403. (14 Pages).
Decker et al. "Mechanistic Study of the Light-Induced Copolymerization of Maleimide/Vinyl Ether Systems", Macromolecular Chemistry and Physics, 201(13): 1493-1503, Aug. 2000.
Fan et al. "UV Curing of a Liquid Based Bismaleimide-Containing Polymer System", XPress Polymer Letters, 1(6): 397-405, 2007.
Jensen et al. "Inkjet-Printed Gold Nanoparticle Electrochemical Arrays on Plastic. Application to Immunodetection of a Cancer Biomarker Protein", Physical Chemistry Chemical Physics, 13(11): 4888-4894, Mar. 21, 2011.
Liu et al. "All-Polymer Capacitor Fabricated With Inkjet Printing Technique", Solid-State Electronics, 47(9): 1543-1548, Sep. 2003.
Zhang et al. "Inkjet Printing of Polyimide Insulators for the 3D Printing of Dielectric Materials for Microelectronic Applications", Journal of Applied Polymer Science, 133: 43361-1-43361-11, May 10, 2016.
Notice of Reasons for Rejection Dated Jul. 8, 2022 From the Japan Patent Office Re. Application No. 2014-513308 and Its Translation Into English. (19 Pages).
Communication Pursuant to Article 94(3) EPC Dated Jan. 20, 2023 From the European Patent Office Re. Application No. 18836915.1 (5 Pages).
Official Action Dated May 25, 2023 from the US Patent and Trademark Office Re. U.S. Appl. No. 16/958,713. (20 pages).
Notice of Reasons for Rejection Dated Jul. 8, 2022 From the Japan Patent Office Re. Application No. 2020-536634 and Its Translation Into English. (19 Pages).
Official Action Dated Oct. 13, 2023 from the US Patent and Trademark Office Re. U.S. Appl. No. 16/958,713. (20 pages).
Office Action Dated Sep. 28, 2023 From the Israel Patent Office Re. Application No. 275712. (6 Pages).
Notice of Allowance together with Interview Summary Dated Apr. 17, 2024 From the US Patent and Trademark Office Re. U.S. Appl. No. 16/958,713. (10 Pages).
Communication Pursuant to Article 94(3) EPC Dated Apr. 25, 2024 From the European Patent Office Re. Application No. 18836916.9 (7 Pages).
Communication Pursuant to Article 94(3) EPC Dated Aug. 17, 2023 From the European Patent Office Re. Application No. 18836915.1. (3 Pages).
Office Action Dated May 30, 2024 From the Israel Patent Office Re. Application No. 275712. (3 Pages).

* cited by examiner

FIG. 3A
FIG. 3B
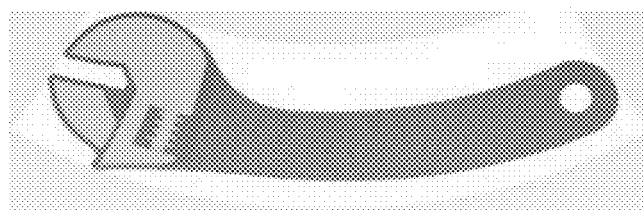
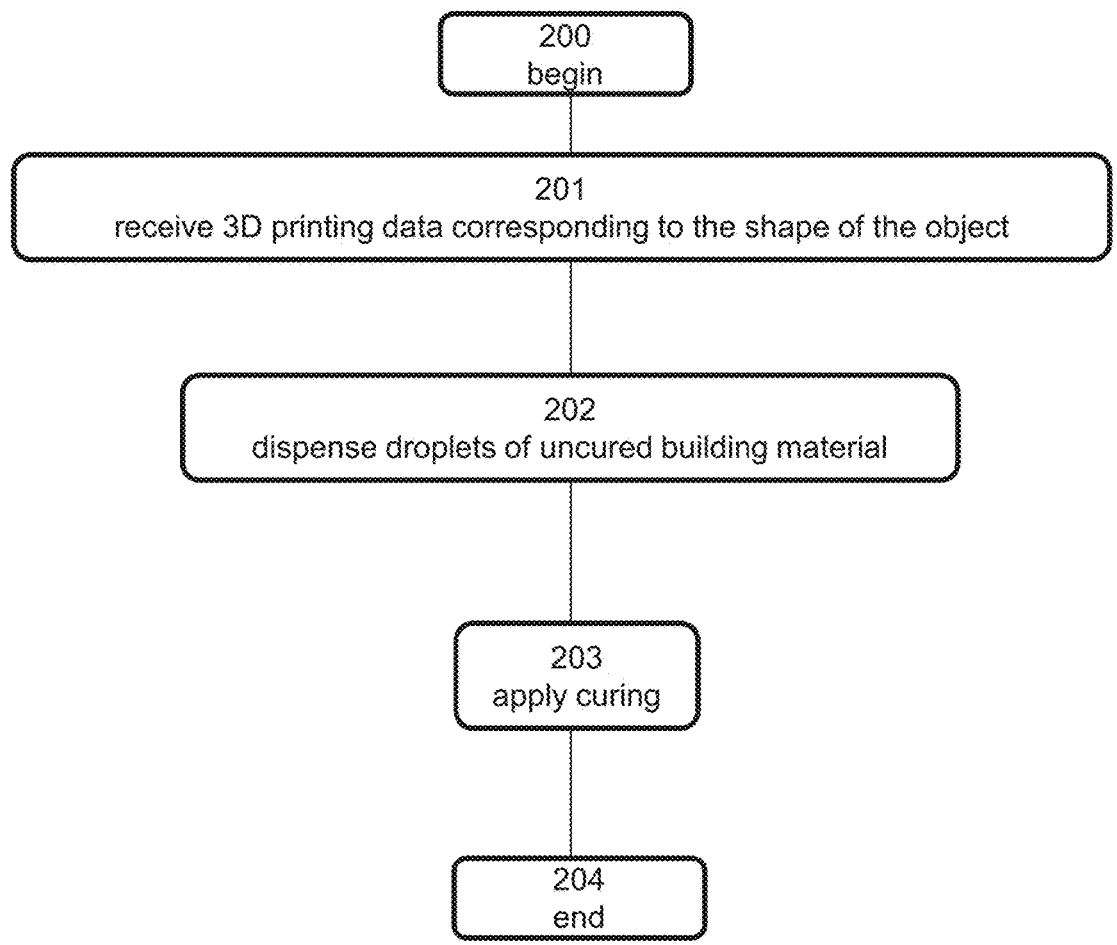
FIG. 4

ADDITIVE MANUFACTURING EMPLOYING SOLVENT-FREE POLYIMIDE-CONTAINING FORMULATIONS

RELATED APPLICATION

This application claims the benefit of priority of U.S. Provisional Patent Application No. 62/610,984 filed on 28 Dec. 2017.

This application is also related to U.S. Provisional Patent Application No. 62/610,983 filed on 28 Dec. 2017.

This application is also related to co-filed PCT Patent Application entitled "ADDITIVE MANUFACTURING EMPLOYING POLYIMIDE-CONTAINING FORMULATIONS".

The contents of the above applications are all incorporated by reference as if fully set forth herein in their entirety.

FIELD AND BACKGROUND OF THE INVENTION

The present invention, in some embodiments thereof, relates to additive manufacturing and, more particularly, but not exclusively, to additive manufacturing using solvent-free polyimide-containing formulations.

Additive manufacturing is generally a process in which a three-dimensional (3D) object is manufactured utilizing a computer model of the objects. Such a process is used in various fields, such as design related fields for purposes of visualization, demonstration and mechanical prototyping, as well as for rapid manufacturing (RM).

The basic operation of any AM system consists of slicing a three-dimensional computer model into thin cross sections, translating the result into two-dimensional position data and feeding the data to control equipment, which manufacture a three-dimensional structure in a layerwise manner.

Various AM technologies exist, amongst which are stereolithography, digital light processing (DLP), and three-dimensional (3D) printing, 3D inkjet printing in particular. Such techniques are generally performed by layer by layer deposition and solidification of one or more building materials, typically photopolymerizable (photocurable) materials.

In three-dimensional printing processes, for example, a building material is dispensed from a print head having a set of nozzles to deposit layers on a supporting structure. Depending on the building material, the layers may then solidify, harden or cure, optionally using a suitable device.

Various three-dimensional printing techniques exist and are disclosed in, e.g., U.S. Pat. Nos. 6,259,962, 6,569,373, 6,658,314, 6,850,334, 7,183,335, 7,209,797, 7,225,045, 7,300,619, 7,479,510, 7,500,846, 7,962,237 and 9,031,680, all of the same Assignee, the contents of which are hereby incorporated by reference.

A printing system utilized in additive manufacturing may include a receiving medium and one or more print heads. The receiving medium can be, for example, a fabrication tray that may include a horizontal surface to carry the material dispensed from the print head. The print head may be, for example, an ink jet head having a plurality of dispensing nozzles arranged in an array of one or more rows along the longitudinal axis of the print head. The print head may be located such that its longitudinal axis is substantially parallel to the indexing direction. The printing system may further include a controller, such as a microprocessor to control the printing process, including the movement of the print head according to a pre-defined scanning plan (e.g., a CAD configuration converted to a Stereo Lithography (STL) format and programmed into the controller). The print head may include a plurality of jetting nozzles. The jetting nozzles dispense material onto the receiving medium to create the layers representing cross sections of a 3D object.

In addition to the print head, there may be a source of curing energy, for curing the dispensed building material. The curing energy is typically radiation, for example, UV radiation.

Additionally, the printing system may include a leveling device for leveling and/or establishing the height of each layer after deposition and at least partial solidification, prior to the deposition of a subsequent layer.

The building materials may include modeling materials and support materials, which form the object and the temporary support constructions supporting the object as it is being built, respectively.

The modeling material (which may include one or more material(s)) is deposited to produce the desired object/s and the support material (which may include one or more material(s)) is used, with or without modeling material elements, to provide support structures for specific areas of the object during building and assure adequate vertical placement of subsequent object layers, e.g., in cases where objects include overhanging features or shapes such as curved geometries, negative angles, voids, and so on.

Both the modeling and support materials are preferably liquid at the working temperature at which they are dispensed, and subsequently harden or solidify, typically upon exposure to curing energy (e.g., UV curing), to form the required layer shape. After printing completion, support structures are removed to reveal the final shape of the fabricated 3D object.

Several additive manufacturing processes allow additive formation of objects using more than one modeling material, also referred to as "multi-material" AM processes. For example, U.S. Patent Application having Publication No. 2010/0191360, of the present Assignee, discloses a system which comprises a solid freeform fabrication apparatus having a plurality of print heads, a building material supply apparatus configured to supply a plurality of building materials to the fabrication apparatus, and a control unit configured for controlling the fabrication and supply apparatus. The system has several operation modes. In one mode, all print heads operate during a single building scan cycle of the fabrication apparatus. In another mode, one or more of the print heads is not operative during a single building scan cycle or part thereof.

In a 3D inkjet printing process such as Polyjet™ (Stratasys Ltd., Israel), the building material is selectively jetted from one or more print heads and deposited onto a fabrication tray in consecutive layers according to a pre-determined configuration as defined by a software file.

U.S. Pat. No. 9,227,365, by the present assignee, discloses methods and systems for solid freeform fabrication of shelled objects, constructed from a plurality of layers and a layered core constituting core regions and a layered shell constituting envelope regions.

The Polyjet™ technology allows control over the position and composition of each voxel (volume pixel), which affords enormous design versatility and digital programming of multi-material structures. Other advantages of the Polyjet™ technology is the very high printing resolution, up to 14 µm layer height, and the ability to print multiple materials simultaneously, in a single object. This multi-material 3D printing process often serves for fabrication of complex parts and structures that are comprised of elements having different stiffness, performance, color or transparency. New range of materials, programmed at the voxel level, can be created by the PolyJet™ printing process, using only few starting materials.

In order to be compatible with most of the commercially-available print heads utilized in a 3D inkjet printing system, the uncured building material should feature the following characteristics: a relatively low viscosity (e.g., Brookfield Viscosity of up to 50 cps, or up to 35 cps, preferably from 8 to 25 cps) at the working (e.g., jetting) temperature; Surface tension of from about 25 to about 55 Dyne/cm, preferably from about 25 to about 40 Dyne/cm; and a Newtonian liquid behavior and high reactivity to a selected curing condition, to enable fast solidification of the jetted layer upon exposure to a curing condition, of no more than 1 minute, preferably no more than 20 seconds. Additional requirements include low boiling point solvents (if solvents are used), e.g., featuring boiling temperature lower than 200 or lower than 190° C., yet characterized preferably by low evaporation rate at the working (e.g., jetting) temperature, and, if the building material includes solid particles, these should feature an average size of no more than 2 microns.

Current PolyJet™ technology offers the capability to use a range of curable (e.g., polymerizable) materials that provide polymeric materials featuring a variety of properties, ranging, for example, from stiff and hard materials (e.g., curable formulations marketed as the Vero™ Family materials) to soft and flexible materials (e.g., curable formulations marketed as the Tango™ and Agilus™ families), and including also objects made using Digital ABS, which contain a multi-material made of two starting materials (e.g., RGD515 & RGD535/531), and simulate properties of engineering plastic. Most of the currently practiced PolyJet materials are curable materials which harden or solidify upon exposure to radiation, mostly UV radiation and/or heat.

In order to expand 3D printing and make it more versatile, new processes should be developed to enable deposition of a broader range of materials, including engineering polymers with various characteristics. Engineering polymers are materials with superior thermal stability and mechanical properties that make them valuable in the manufacturing of structural elements.

Polyimides are very promising materials for additive manufacturing such as 3D inkjet printing, as these materials feature desirable characteristics such as high thermal stability, excellent mechanical properties, wear resistance, radiation resistance, inertness to solvents, low dielectric constant, and good adhesion strengths. Some polyimides are thermoplastic and some are thermosetting polymer. The properties of the polyimide can be determined by the chemical structure of the monomeric precursor and/or the polymerization mechanism, with an endless number of polymeric precursors and an enormous range of applications of the resulting polyimides.

However, the use of polyimides in additive manufacturing, and in 3D inkjet printing methodologies in particular, is limited mostly by the relatively long time that is required for these materials to solidify (cure). See, for example, F. Zhang et al., in J. Applied Polymer Science, 2016, 133, 43361. A further limitation lies in the properties of the polyimide obtained by these processes. Thus, for example, Ultem, a thermoplastic polyetherimide, which is currently used in 3D printing by FDM (Fused Deposition Modeling) technology, was shown to feature properties, which are inferior to the corresponding neat polyimide (see, for example, www(dot)stratasys(dot)com/materials/fdm/ultem-9085. Polyimide films formed by inkjet printing by jetting polyamic solutions following by thermal imidization were reported in Liu et al. Solid State Electron. 2003, 47, 1543; and Jensen et al., J. F. Phys. Chem. Chem. Phys. 2011, 13, 4888. F. Zhang et al., in J. Applied Polymer Science, 2016, 133, 43361, reported that 3D insulators were printed using the same approach of polyamic acid condensation, however the Z-dimension of these structures was below 1 μm.

International Patent Application No. PCT/IB2017/054054, filed Jul. 5, 2017, describes solutions containing a bismaleimide (BMI) as a chemical precursor of a polyimide, in a suitable solvent, optionally along with a polymerization initiator (e.g., photoinitiator), a surfactant, a stabilizer, a reinforcer, or any other additive.

EP Patent No. 1857478B1, which is incorporated by reference as if fully set forth herein, describes a curable formulation for inkjet printing, which comprises a bis-allyl-nadi-imide compound as defined by Formula I therein, a bismaleimide as defined by Formula II therein, and a diluent which comprises a polymerizable material and optionally an organic solvent. According to the teachings of EP Patent No. 1857478B1, the amount of the polymerizable material should be at least 25 parts by weight per 100 parts by weight of the bis-allyl-nadi-imide compound.

Additional background art includes WO2016/151586, by the present assignee, which describes using polyimides within a sintering inducing formulation, in additive manufacturing that utilize a catalytic ink; Decker et al., Macromolecular Chemistry and Physics, 201(13):1493-1503, 2000; and Fan et al., Express Polymer Letters 1(6):397-405, 2007.

SUMMARY OF THE INVENTION

According to an aspect of some embodiments of the present invention there is provided a method of additive manufacturing of a three-dimensional object which comprises, in at least a portion thereof, a polyimide-containing material, the method comprising sequentially forming a plurality of layers in a configured pattern corresponding to the shape of the object, thereby forming the object, wherein the formation of each of at least a few of the layers comprises dispensing at least one modeling material formulation which comprises a polyimide precursor and a multi-functional curable material; and exposing each of the dispensed layers to a curing condition to thereby form a cured modeling material comprising the polyimide-containing material.

According to some of any of the embodiments described herein, the at least one modeling material formulation which comprises the polyimide precursor is devoid of an organic solvent; and/or the at least one modeling material formulation which comprises the polyimide precursor is devoid of a bis-allyl-nadi-imide compound; and/or the curing condition does not include infrared radiation; and/or an amount of the multifunctional curable material in the modeling material formulation is less than 25 weight percents.

According to some of any of the embodiments described herein, the at least one modeling material formulation which comprises the polyimide precursor is devoid of an organic solvent.

According to some of any of the embodiments described herein, the organic solvent is a polar organic solvent.

According to some of any of the embodiments described herein, the organic solvent has a boiling temperature lower than 190° C. and/or evaporation rate lower than 1, or lower than 0.5.

According to some of any of the embodiments described herein, the at least one modeling material formulation which comprises the polyimide precursor is devoid of a bis-allyl-nadi-imide compound.

According to some of any of the embodiments described herein, a viscosity of the modeling material formulation containing the polyimide precursor is from about 16 to about 20 centipoises at 70° C.

According to some of any of the embodiments described herein, the polyimide precursor is bismaleimide.

According to some of any of the embodiments described herein, the polyimide precursor has a molecular weight of from 300 to 2000 Daltons.

According to some of any of the embodiments described herein, the polyimide precursor is represented by Formula I:

Formula I wherein:
L is a linking moiety; and
$R_1$-$R_4$ are each independently selected from hydrogen, alkyl and cycloalkyl.

According to some of any of the embodiments described herein, $R_1$-$R_4$ are each hydrogen.

According to some of any of the embodiments described herein, the linking moiety L is or comprises a hydrocarbon.

According to some of any of the embodiments described herein, the hydrocarbon comprises two or more alkylene chains that are connected therebetween via a branching unit.

According to some of any of the embodiments described herein, the branching unit comprises or consists of a cycloalkyl.

According to some of any of the embodiments described herein, a weight ratio of the polyimide precursor and the multifunctional curable material in the modeling material formulation ranges from 50:50 to 90:10.

According to some of any of the embodiments described herein, an amount of the multifunctional curable material in the modeling material formulation comprising the polyimide precursor is less than 25 weight percents of the total weight of the formulation.

According to some of any of the embodiments described herein, a weight ratio of the polyimide precursor and the multifunctional curable material in the modeling material formulation ranges from 80:20 to 90:10.

According to some of any of the embodiments described herein, the multifunctional curable material features a viscosity at room temperature of less than 15 centipoises or less than 10 centipoises.

According to some of any of the embodiments described herein, the multifunctional curable material features a flash point at least 10° C. higher than a temperature applied to the formulation during the method.

According to some of any of the embodiments described herein, the multifunctional curable material comprises two or more polymerizable moieties linked to one another via a hydrocarbon.

According to some of any of the embodiments described herein, the hydrocarbon comprises from 3 to 20, or from 3 to 10, or from 3 to 8, or from 4 to 8, carbon atoms, optionally interrupted by 1-4 heteroatoms.

According to some of any of the embodiments described herein, the multifunctional curable material is a difunctional curable material.

According to some of any of the embodiments described herein, the difunctional curable material is represented by Formula II:

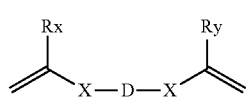

Formula II wherein:
X is selected from —O— and —O—C(═O)—;
D is a hydrocarbon of from 3 to 20, or from 3 to 10, or from 3 to 8, or from 4 to 8, carbon atoms, optionally interrupted by 1-4 heteroatoms; and
Rx and Ry are each independently selected from hydrogen, alkyl and cycloalkyl.

According to some of any of the embodiments described herein, the hydrocarbon consists of an alkyl, a cycloalkyl, an aryl, an alkaryl, or any combination thereof.

According to some of any of the embodiments described herein, the method further comprises subjecting the object to thermal treatment.

According to some of any of the embodiments described herein, the thermal treatment comprises exposing the object to heat for at least one hour at a temperature of at least 100° C.

According to an aspect of some embodiments of the present invention there is provided a three-dimensional object prepared by the method of any of the embodiments described herein and any combination thereof.

According to an aspect of some embodiments of the present invention there is provided a three-dimensional object comprising, in at least a portion thereof, a polyimide-containing material, the portion of the object being characterized by: Storage Modulus (E') and/or glass transition temperature (Tg) which is higher by at least 10% than a storage modulus and/or glass transition temperature, respectively, of a portion of an object which is essentially consisted of the polyimide.

According to an aspect of some embodiments of the present invention there is provided a formulation comprising a polyimide precursor and a multifunctional curable material.

According to some of any of the embodiments described herein, the formulation is devoid of an organic solvent; and/or the formulation is devoid of a bis-allyl-nadi-imide compound; and/or an amount of the multifunctional curable material in is less than 25 weight percents of the total weight of the formulation.

According to an aspect of some embodiments of the present invention there is provided a formulation comprising a polyimide precursor and a multifunctional curable material, the multifunctional curable material featuring at least one of: a viscosity at room temperature of less than 15 centipoises or less than 10 centipoises; and a flash point of at least 80° C.

According to some of any of the embodiments described herein, the formulation is devoid of an organic solvent; and/or the formulation is devoid of a bis-allyl-nadi-imide compound; and/or an amount of the multifunctional curable material in is less than 25 weight percents of the total weight of the formulation.

According to some of any of the embodiments described herein, the formulation is devoid of an organic solvent and/or is for use in additive manufacturing (e.g., inkjet printing) without adding thereto an organic solvent as defined herein.

According to some of any of the embodiments described herein, the organic solvent is a polar organic solvent.

According to some of any of the embodiments described herein, the organic solvent has a boiling temperature lower than 190° C. and/or an evaporation rate lower than 1, or lower than 0.5.

According to some of any of the embodiments described herein, the formulation is devoid of a bis-allyl-nadi-imide compound, as defined herein, and/or is for use in additive manufacturing (e.g., inkjet printing) without combining therewith a bis-allyl-nadi-imide compound, as defined herein.

According to some of any of the embodiments described herein, the formulation features a viscosity of from about 16 to about 20 centipoises at 70° C.

According to some of any of the embodiments described herein, the polyimide precursor is bismaleimide.

According to some of any of the embodiments described herein, the polyimide precursor has a molecular weight of from 300 to 2000 Daltons.

According to some of any of the embodiments described herein, the polyimide precursor is represented by Formula I as defined herein in any of the respective embodiments and any combination thereof.

According to some of any of the embodiments described herein, a weight ratio of the polyimide and the multifunctional curable material in the formulation ranges from 50:50 to 90:10.

According to some of any of the embodiments described herein an amount of the multifunctional curable material is less than 25 weight percents of the total weight of the formulation.

According to some of any of the embodiments described herein, a weight ratio of the polyimide and the multifunctional curable material in the formulation ranges from 80:20 to 90:10.

According to some of any of the embodiments described herein, the multifunctional curable material features a viscosity at room temperature of less than 15 centipoises or less than 10 centipoises.

According to some of any of the embodiments described herein, the multifunctional functional curable material features a flash point at least 10° C. higher than a temperature of applied to the formulation during the method.

According to some of any of the embodiments described herein, the multifunctional curable material comprises two or more polymerizable moieties linked to one another via a hydrocarbon.

According to some of any of the embodiments described herein, the hydrocarbon comprises from 3 to 20, or from 3 to 10, or from 3 to 8, or from 4 to 8, carbon atoms, optionally interrupted by 1-4 heteroatoms.

According to some of any of the embodiments described herein, the multifunctional curable material is a difunctional curable material.

According to some of any of the embodiments described herein, the difunctional curable material is represented by Formula II, as described herein in any of the respective embodiments and any combination thereof.

According to some of any of the embodiments described herein, the hydrocarbon consists of an alkyl, a cycloalkyl, an aryl, an alkaryl, or any combination thereof.

According to some of any of the embodiments described herein, the formulation further comprises a photoinitiator.

According to some of any of the embodiments described herein, the formulation is identified for use in additive manufacturing of a three-dimensional object, which comprises, in at least a portion thereof, a polyimide material.

According to an aspect of some embodiments of the present invention there is provided a kit comprising the formulation as described herein in any of the respective embodiments and any combination thereof, packaged in a packaging material.

According to some of any of the embodiments described herein, the kit further comprises a photoinitiator.

According to some of any of the embodiments described herein, the photoinitiator is packaged separately from the formulation.

According to some of any of the embodiments described herein, the kit is identified for use in additive manufacturing of a three-dimensional object, which comprises, in at least a portion thereof, a polyimide material.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF SEVERAL VIEWS OF THE DRAWINGS

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 3A and 3B are schematic illustrations demonstrating coordinate transformations according to some embodiments of the present invention;

FIG. 4 is a flowchart diagram of a method suitable for AM of a three-dimensional object according to various exemplary embodiments of the present invention;

DESCRIPTION OF SPECIFIC EMBODIMENTS OF THE INVENTION

Figure 1A:
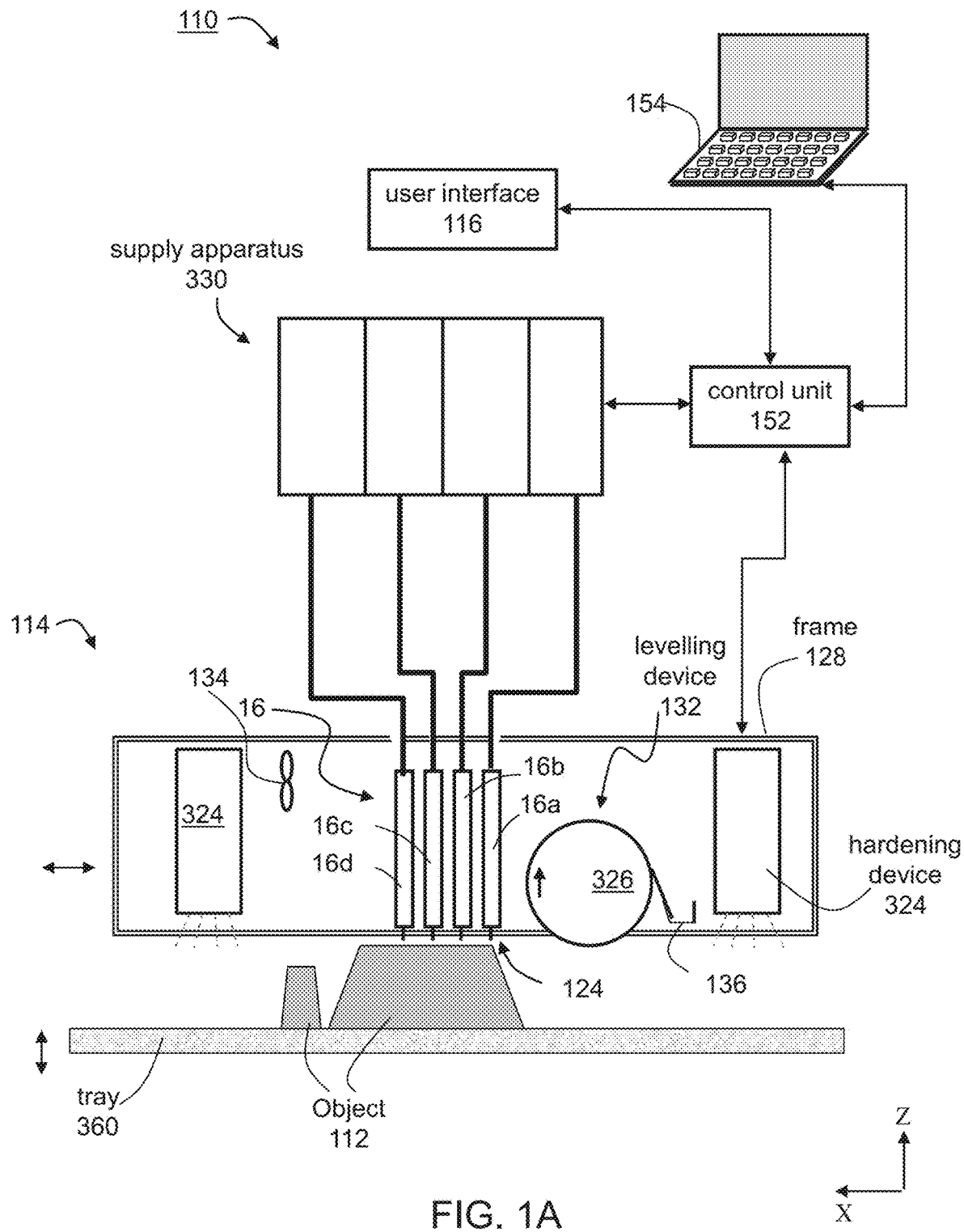
FIGS. 1A-D are schematic illustrations of an additive manufacturing system according to some embodiments of the invention.

The present invention, in some embodiments thereof, relates to additive manufacturing and, more particularly, but not exclusively, to additive manufacturing using polyimide-containing formulations.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As discussed hereinabove, the most common curable materials that are usable in additive manufacturing, and particularly in 3D inkjet printing, of 3D objects, are photocurable materials of the acrylate family (that is, acrylates, methacrylates, arylamides, methacryl amides, and like compounds, which are collectively referred to herein as "acrylic materials").

Polyimides are polymers which are characterized by exceptionally high thermal stability (e.g., up to 450° C.), which supersedes that of polymers formed of acrylic materials.

Conventional synthesis of polyimides is based on the reaction between cyclic dianhydride and diamine, which results in polyamic acid. The polyamic acid undergoes cyclization reaction during heating to give thermoplastic polyamide. This polymerization route is not suitable for additive manufacturing such as 3D inkjet printing, since the reaction takes place in organic solvents and at elevated temperatures.

Another polymerization route is based on a bismaleimide (BM1) precursor, which undergoes an addition type-polymerization that results in a thermosetting polyimide. This polymerization reaction can be activated thermally or by UV.

The bismaleimide is typically solid in room temperature. Currently, there is a limited number of liquid bismaleimides, and these include, for example, those marketed as BMI689, BMI1400, BMI1500 and BMI3000, by Designer Molecules. However, the liquid bismaleimides are characterized by a viscosity that is not suitable for inkjet printing. BMI689, which has the lowest viscosity among all, features a viscosity of 1500±500 cPs at room temperature.

A further discussed hereinabove, 3D inkjet printing processes require a viscosity of about 8-25 cPs at the jetting temperature.

EP Patent No. 1857478 and PCT/IB2017/054054 describe formulations containing a polyimide precursor (e.g., BMI), in which the viscosity has been reduced by addition of an organic solvent. Such formulations, when utilized in additive manufacturing, require removal of the organic solvent, typically by evaporation, thus rendering the process time and energy consuming, in addition to being environmentally unfriendly.

EP Patent No. 1857478 further describes adding a reactive diluent to a formulation containing a mixture of polyimide precursors, in a form of a curable material (e.g., a polymerizable monomer or oligomer). Such curable materials presumably form a part of the final object, by chemically interacting with the polyimide precursors, as described, for example, in Decker et al. (2000) and Fan et al. (2007), supra.

However, these chemical interactions may adversely affect the mechanical and thermal properties of the obtained polymeric material.

The present inventors have now surprisingly uncovered that certain curable materials can be added as reactive diluents to polyimide precursors while circumventing the need to add an organic solvent and while maintaining and even improving the thermal and mechanical properties of the obtained polymeric material, that is, without adversely affecting the properties of the obtained polymeric material and hence of a three-dimensional object obtained while utilizing the polyimide precursors. The present inventors have shown that such formulations can be successfully employed in 3D inkjet printing such as the Polyjet technology, while providing hardened materials which feature exceptional thermal stability, which is unachievable by any other available materials for this technology.

Embodiments of the present invention therefore relate to novel formulations, which are usable in additive manufacturing such as 3D inkjet printing, to kits comprising these formulations, to additive manufacturing utilizing these formulations and to 3D objects obtained thereby.

Herein throughout, the term "object" describes a final product of the additive manufacturing. This term refers to the product obtained by a method as described herein, after removal of the support material, if such has been used as part of the building material. The "object" therefore essentially consists (at least 95 weight percents) of a hardened (e.g., cured) modeling material.

The term "object" as used herein throughout refers to a whole object or a part thereof.

An object according to the present embodiments is such that at least a part or a portion thereof comprises a polyimide material. The object may be such that several parts or portions thereof are made of a polyimide material, or such that is entirely made of a polyimide material. The polyimide material can be the same or different in the different parts or portions, and, for each part, portion or the entire object made of a polyimide material, the polyimide material can be the same or different within the portion, part or object. When different polyimide materials are used, they can differ in their chemical composition and/or mechanical properties, as is further explained hereinafter.

The phrase "polyimide material" is also referred to herein interchangeably as "polyimide-containing material" and, as used herein, describes a polymeric material, which comprises in at least a portion thereof backbone units of a polyimide. A polyimide material, according to the present embodiments, can be made of polymeric chains or a 3D network of polymeric chains, in which backbone units of a polyimide and of another polymer (formed of the additional curable material as described herein) are interlaced with one another, and/or of polymeric chains of a 3D network of polymeric chains, comprised of polyimide chains which are chemically linked to (e.g., which cross-link or which are cross-linked by) polymeric chains of another polymer (formed of the additional curable material as described herein).

Herein throughout, the phrases "building material formulation", "uncured building material", "uncured building material formulation", "building material" and other variations therefore, collectively describe the materials that are dispensed to sequentially form the layers, as described herein. This phrase encompasses uncured materials dispensed so as to form the object, namely, one or more uncured modeling material formulation(s), and uncured materials dispensed so as to form the support, namely uncured support material formulations.

Herein throughout, the phrase "cured modeling material" or "hardened modeling material" describes the part of the building material that forms the object, as defined herein, upon exposing the dispensed building material to curing, and, optionally, if a support material has been dispensed, also upon removal of the cured support material, as described herein. The cured modeling material can be a single cured material or a mixture of two or more cured materials, depending on the modeling material formulations used in the method, as described herein.

The phrase "cured modeling material" or "cured modeling material formulation" can be regarded as a cured building material wherein the building material consists only of a modeling material formulation (and not of a support material formulation). That is, this phrase refers to the portion of the building material, which is used to provide the final object.

Herein throughout, the phrase "modeling material formulation", which is also referred to herein interchangeably as "modeling formulation", "model formulation" "model material formulation" or simply as "formulation", describes a part or all of the building material which is dispensed so as to form the object, as described herein. The modeling material formulation is an uncured modeling formulation (unless specifically indicated otherwise), which, upon exposure to curing condition, forms the object or a part thereof.

In some embodiments of the present invention, a modeling material formulation is formulated for use in three-dimensional inkjet printing (e.g., feature rheological, thermal and physical properties that meet the requirements of a 3D inkjet system and process) and is able to form a three-dimensional object on its own, i.e., without having to be mixed or combined with any other substance.

An uncured building material can comprise one or more modeling material formulations, and can be dispensed such that different parts of the object are made, upon curing, of different cured modeling material formulations or different combinations thereof, and hence are made of different cured modeling materials or different mixtures of cured modeling materials.

The formulations forming the building material (modeling material formulations and support material formulations) comprise one or more curable materials, which, when exposed to a curing condition, form hardened (cured) material.

Herein throughout, a "curable material" is a compound (typically a monomeric or oligomeric compound, yet optionally a polymeric material) which, when exposed to a curing condition, as described herein, solidifies or hardens to form a cured material. Curable materials are typically polymerizable materials, which undergo polymerization and/or cross-linking when exposed to a suitable curing condition (e.g., a suitable energy source).

A curable material, according to the present embodiments, also encompasses materials which harden or solidify (cure) without being exposed to a curing energy, but rather to a curing condition (for example, upon exposure to a chemical reagent), or simply upon exposure to the environment.

The terms "curable" and "solidifyable" as used herein are interchangeable.

The polymerization can be, for example, free-radical polymerization, cationic polymerization or anionic polymerization, and each can be induced when exposed to curing energy such as, for example, radiation, heat, etc., as described herein.

In some of any of the embodiments described herein, a curable material is a photopolymerizable material, which polymerizes and/or undergoes cross-linking upon exposure to radiation, as described herein, and in some embodiments the curable material is a UV-curable material, which polymerizes and/or undergoes cross-linking upon exposure to UV radiation, as described herein.

In some embodiments, a curable material as described herein is a photopolymerizable material that polymerizes via photo-induced free-radical polymerization. Alternatively, the curable material is a photopolymerizable material that polymerizes via photo-induced cationic polymerization.

In some embodiments, a curable material is or comprises a polyimide precursor, which is polymerizable via photo-induced addition polymerization.

In some of any of the embodiments described herein, a curable material can be a monomer, an oligomer or a short-chain polymer, each being polymerizable and/or cross-linkable as described herein.

In some of any of the embodiments described herein, when a curable material is exposed to a curing condition (e.g., radiation), it hardens (undergoes curing) by any one, or combination, of chain elongation and cross-linking.

In some of any of the embodiments described herein, a curable material is a monomer or a mixture of monomers which can form a polymeric material upon a polymerization reaction, when exposed to a curing condition (e.g., curing energy) at which the polymerization reaction occurs. Such curable materials are also referred to herein as monomeric curable materials.

In some of any of the embodiments described herein, a curable material is an oligomer or a mixture of oligomers which can form a polymeric material upon a polymerization reaction, when exposed to a curing condition (e.g., curing energy) at which the polymerization reaction occurs. Such curable materials are also referred to herein as oligomeric curable materials.

In some of any of the embodiments described herein, a curable material is a polymer or a mixture of polymers which can form a polymeric or co-polymeric material upon a polymerization reaction, by chain extension or addition, or which cross-link, or is cross-linked by, other curable materials, when exposed to curing energy at which the polymerization reaction occurs. Such curable materials are also referred to herein as polymeric curable materials.

In some of any of the embodiments described herein, a curable material, whether monomeric or oligomeric, can be a mono-functional curable material or a multi-functional curable material.

Herein, a mono-functional curable material comprises one functional group that can undergo polymerization when exposed to a curing condition (e.g., curing energy such radiation).

A multi-functional curable material comprises two or more, e.g., 2, 3, 4 or more, functional groups that can undergo polymerization when exposed to a curing condition (e.g., curing energy). Multi-functional curable materials can be, for example, di-functional, tri-functional or tetra-functional curable materials, which comprise 2, 3 or 4 groups that can undergo polymerization, respectively. The two or more functional groups in a multi-functional curable material are typically linked to one another by a linking moiety, as defined herein. When the linking moiety is an oligomeric or polymeric moiety, the multi-functional group is an oligomeric or polymeric multi-functional curable material. Multi-functional curable materials can undergo polymerization when subjected to a curing condition (e.g., curing energy) and/or act as cross-linkers.

The method of the present embodiments manufactures three-dimensional objects in a layerwise manner by forming a plurality of layers in a configured pattern corresponding to the shape of the objects, as described herein.

The final three-dimensional object is made of the modeling material or a combination of modeling materials or a combination of modeling material/s and support material/s or modification thereof (e.g., following curing). All these operations are well-known to those skilled in the art of solid freeform fabrication.

According to an aspect of some embodiments of the present invention there is provided a method of additive manufacturing of a three-dimensional object which comprises, in at least a portion thereof (as described in further detail hereinafter) a polyimide-containing material, as defined herein.

The method is generally effected by sequentially forming a plurality of layers in a configured pattern corresponding to the shape of the object, such that formation of each of at least a few of said layers, or of each of said layers, comprises dispensing a building material (uncured) which comprises one or more modeling material formulation(s), and exposing the dispensed modeling material to a curing condition (e.g., curing energy) to thereby form a cured modeling material, as described in further detail hereinafter.

According to embodiments of the present invention, the one or more modeling material formulation(s) comprise a polyimide precursor and an additional curable material, as described herein. The polyimide precursor and the additional curable material, according to the present embodiments, are included in the same modeling material formulation. When two or more modeling material formulations are used, additional modeling material formulations can include a different polyimide precursor and/or a different additional curable material, or can include curable materials other than the polyimide precursor and/or the additional curable material.

According to some embodiments of any of the embodiments of the present invention the additive manufacturing is 3D inkjet printing.

In some exemplary embodiments of the invention an object is manufactured by dispensing a building material (uncured) that comprises two or more different modeling material formulations, each modeling material formulation from a different dispensing (e.g., printing) head or from a different nozzle or a different array of nozzles of an inkjet printing apparatus. The modeling material formulations are optionally and preferably deposited in layers during the same pass of the dispensing (e.g., printing) heads. The modeling material formulations and/or combination of formulations within the layer are selected according to the desired properties of the object, and as further described in detail hereinbelow.

The phrase "digital materials", abbreviated as "DM", as used herein and in the art, describes a combination of two or more materials on a microscopic scale or voxel level such that the printed zones of a specific material are at the level of few voxels, or at a level of a voxel block. Such digital materials may exhibit new properties that are affected by the selection of types of materials and/or the ratio and relative spatial distribution of two or more materials.

In exemplary digital materials, the modeling material of each voxel or voxel block, obtained upon curing, is independent of the modeling material of a neighboring voxel or voxel block, obtained upon curing, such that each voxel or voxel block may result in a different model material and the new properties of the whole part are a result of a spatial combination, on the voxel level, of several different model materials.

Herein throughout, whenever the expression "at the voxel level" is used in the context of a different material and/or properties, it is meant to include differences between voxel blocks, as well as differences between voxels or groups of few voxels. In preferred embodiments, the properties of the whole part are a result of a spatial combination, on the voxel block level, of several different model materials.

The Modeling Material Formulation:

According to an aspect of some embodiments of the present invention, there is provided a formulation which comprises a polyimide precursor, as described herein, and a curable material (other than the polyimide precursor, also referred to herein as "an additional curable material), as described herein. The formulation is usable, or is for use, according to some embodiments of the present invention, in additive manufacturing of an object that comprises, in at least a portion thereof, a polyimide-containing material, as defined herein.

According to some of any of the embodiments described herein, the formulation features a viscosity that is suitable for additive manufacturing such as 3D inkjet printing, that is, of from about 8 to about 25 centipoises (cps), or of from about 16 to about 20 centipoises, at the jetting temperature (the temperature of the dispensing heads, e.g., print heads). In some embodiments, the jetting temperature is 50-90° C., and in some embodiments it is 70° C. In some embodiments, the formulation features a viscosity of from about 8 to about 25 centipoises (cps), or from about 16 to about 20 centipoises, at 70° C.

According to some of any of the embodiments described herein, the formulation is devoid of an organic solvent.

In some of these embodiments, the solvent is as described in International Patent Application No. PCT/IB2017/054054.

In some of any of the embodiments described herein in the context of an organic solvent, the solvent is an organic polar solvent.

According to some of any of the embodiments described herein, the formulation is devoid of a polar organic solvent.

In some embodiments, the organic solvent is or comprises an alcohol and/or a carboxylic acid ester. In some embodiments, the organic solvent is characterized by a boiling temperature below 190° C. and a low evaporation rate, lower than 1, or lower than 0.5, preferably lower than 0.3.

An evaporation rate, as used herein, refers to n-butyl acetate as the reference material.

Exemplary organic solvents (e.g., polar organic solvents) include, but are not limited to, n-butyl acetate, n-pentyl acetate, n-hexyl acetate, n-heptyl acetate, n-butyl propionate, n-pentyl propionate, n-hexyl propionate, n-heptyl propionate, hexanol, butanol, pentanol, heptanol, as well branched alcohols, and esters containing branched alkyls.

As used herein throughout, the phrase "devoid of" means that the formulation contains no more than 1%, preferably no more than 0.5%, or no more than 0.1%, or no more than 0.05%, or no more than 0.01%, or no more than 0.005%, by weight, of the total weight of the respective formulation, and even less weight percents, or null, of the respective material (e.g., an organic solvent as described herein).

According to some of any of the embodiments described herein, the formulation comprises a curable material, which, upon exposure to a curing condition, forms a polyimide. Such a curable material is also referred to herein as "a polyimide precursor" and the modeling formulation that comprises such a curable material is referred to herein as a polyimide precursor-containing formulation.

Polyimide precursors typically include one or more imide moieties and one or more polymerizable moieties.

An imide moiety is a group that consists of two acyl groups bound to a nitrogen atom, and can be represented by —C(=O)—NRa—C(=O)—, wherein Ra can be, for example, hydrogen, alkyl, cycloalkyl, aryl, alkaryl, and any other substituent as defined herein for other chemical groups.

According to some embodiments of the present invention, polyimide precursors that are usable in the context of the present embodiments include $\alpha,\omega$-bismaleimides (BMIs).

BMIs are precursors of polyimides that are used for the preparation of thermosetting materials.

$\alpha,\omega$-Bismaleimides feature two imide moieties which are linked to one another via a linking moiety and which further feature polymerizable moieties that undergo homopolymerization and/or copolymerization when exposed to UV irradiation, thermal energy and/or chemical catalysis, to thereby provide a cross-linked polyimide, as depicted in Scheme 1 below.

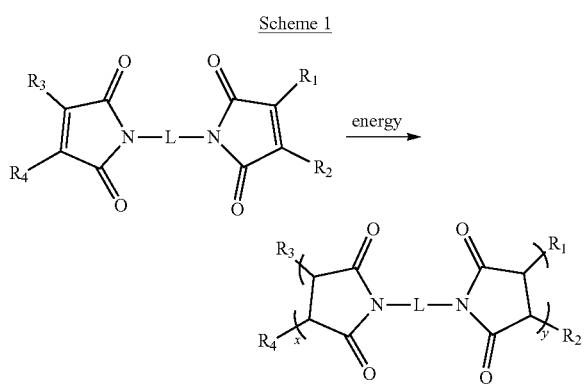

The double bond of the maleimide end-group is highly electron deficient due to the adjacent electron-withdrawing acyl groups. Hence, low molecular weight bismaleimide precursors can undergo homo- and/or copolymerization at the carbon-carbon double bond to provide a crosslinked network.

Additionally, the unsaturated alkenyl group is a very reactive dienophile and, therefore, can undergo addition reactions such as Michael addition of amines (e.g., polyamines) and Diels-Adler addition of dienes.

The obtained polyimide materials are thermosetting materials that are characterized by relative ease of processing and the ability to tailor specific rheological properties by controlling the molecular weight and possibly the chemical composition of the linking moiety. Additionally, the obtained PIs have excellent retention of physical properties at high temperatures, in wet environments and in the presence of solvents and lubricating fluids.

$\alpha,\omega$-Bismaleimides usable in the context of the present embodiments can be collectively represented by Formula I:

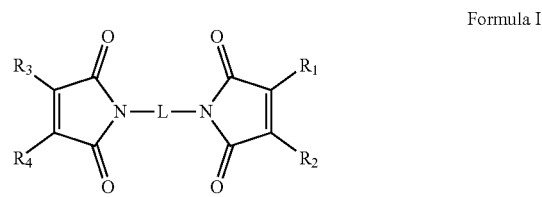

Formula I wherein:

L is a linking moiety which can be, or comprise, an alkyl, an aryl, a cycloalkyl, a hydrocarbon, as these terms are defined herein, or, alternatively, a heteroalicyclic, a heteroaryl, a poly(alkylene chain) and any combination of the foregoing; and $R_1$-$R_4$ are each independently selected from hydrogen, alkyl, cycloalkyl and optionally any other substituent as described herein.

Preferably, $R_1$-$R_4$ are each hydrogen.

The chemical composition and molecular weight of the linking moiety L determine the properties of the obtained polyimide.

In some embodiments, the L linking moiety is a hydrocarbon, as defined herein. In some embodiments, the hydrocarbon consists of one or more alkylene chains. In some embodiments, the hydrocarbon comprises two or more alkylene chains that are connected therebetween via a branching unit. In some embodiments, the branching unit comprises or consists of a cycloalkyl.

In some embodiments, the L linking moiety is represented by the Formula:

A1-B-A2 wherein A1 and A2 are each an alkylene chain and B is a branching unit. In some embodiments, B is a cycloalkyl, for example, a cyclohexyl, which is further substituted by one or more alkylene chains.

In some embodiments, A1 and A2 and optional alkylene chains substituting the cycloalkyl are each independently of 3 to 20 carbon atoms in length, or of 3 to 15, or of 3 to 10, or of 5 to 10, carbon atoms in length.

The term "branching unit" as used herein describes a multi-radical, preferably aliphatic or alicyclic, group. By "multi-radical" it is meant that the linking moiety has two or more attachment points such that it links between two or more atoms and/or groups or moieties.

In some embodiments, the branching unit is derived from a chemical moiety that has two, three or more functional groups. In some embodiments, the branching unit is a branched alkyl or is a cycloalkyl as defined herein.

In some of any of the embodiments described herein, the linking moiety is selected such that the molecular weight of the BMI is in the range of from 200 to 5000 Daltons, preferably from 300 to 2000 Daltons, or from 300 to 1000 Daltons, of from 500 to 1000 Daltons.

An exemplary BMI is BMI-689 as described herein, having a molecular weight of 689 Daltons.

According to some of any of the embodiments described herein, a modeling material formulation comprises one or more bismaleimide(s) as described herein, and/or one or more other polyimide precursor(s). Any other polyimide precursor known in the art is contemplated.

According to some of any of the embodiments described herein, a polyimide precursor is other than a bis-allyl-nadi-imide compound.

According to some of any of the embodiments described herein, the polyimide precursor-containing formulation is devoid of (as defined herein) a bis-allyl-nadi-imide compound.

Exemplary bis-allyl-nadi-imide compounds encompassed by these embodiments are described in EP Patent No. 1857478B1 (see, Formula I therein).

According to some of any of the polyimide precursor undergoes polymerization upon exposure to thermal energy, UV irradiation or both.

In some of any of the embodiments described herein, a modeling material formulation that comprises a polyimide precursor as described herein (e.g., BMI) undergoes fast curing (1-20 seconds per layer), forming a three-dimensional network of a thermosetting polyimide-containing material.

The curing can be done by exposure to thermal energy (heat), UV irradiation, or both.

According to the present embodiments, a modeling material formulation that comprises a polyimide precursor as defined herein further comprises one or more additional curable material(s).

Preferably, but not obligatory, the additional curable material is polymerizable when exposed to the same curing condition (e.g., curing energy) at which the polyimide precursor is polymerizable, for example, upon exposure to irradiation (e.g., UV-vis irradiation).

Thus, in some embodiments, the additional curable material is a photo-curable or photopolymerizable material. In some embodiments, the additional curable material is a UV-curable material.

According to some of any of the embodiments described herein, the additional curable material is a multifunctional curable material as defined herein, and, in some of these embodiments, it is a UV-curable multifunctional curable material.

As discussed hereinabove, the additional curable material is selected such that the formulation comprising same, which further comprises a polyimide precursor, is suitable for use in additive manufacturing, e.g., in 3D inkjet printing, that is, the formulation features physical and rheological properties that meet the requirements of such processes, as described herein.

In some embodiments, the multifunctional curable material is such that provides a formulation that features a viscosity as defined herein.

In some of any of the embodiments described herein, the multifunctional curable material is characterized as featuring a viscosity, at room temperature, of less than 15 centipoises or less than 10 centipoises.

Whenever a viscosity or any other property is described herein, this property is determined according to procedures and/or by measurements devices which are commonly used in the art for determining the respective property. Exemplary procedures and devices are defined in the Examples section that following (under the "Materials and Experimental Methods" section).

In some of any of the embodiments described herein, the multifunctional curable material is characterized as featuring a flash point that is higher by at least 5° C., or at least 10° C., preferably by at least 20° C., e.g., by 30° C. or more, than a temperature that is applied to the formulation during an additive manufacturing process.

By "flash point" it is meant the lowest temperature at which a material ignites when exposed to an ignition source (e.g., oxygen). Flash point of a material can be determined by means known in the art, for example, according to ISO TR 29662.

A temperature applied to the formulation during an additive manufacturing process can be the jetting temperature (e.g., the temperature of the dispensing heads, e.g., printing heads and/or nozzles during 3D inkjet printing); the temperature of the receiving tray onto which layers are dispensed; a temperature of the dispensed layers (which may increase in case of an exothermic reaction between materials in the dispensed formulation(s), and/or due to application of curing energy); and a temperature of the immediate environment of the dispensed layers (e.g., in a chamber at which the process is performed).

In some embodiments, the flash point is higher, as defined herein, than a temperature that develops in the dispensed formulation (e.g., a temperature of the dispensed layer that comprises the formulation and/or of a preceding layer onto which the formulation is applied) due to an exothermic reaction between the materials upon exposure to curing energy.

In some embodiments, the flash point is higher, as defined herein, than a temperature of the dispensing heads and/or nozzles (e.g., inkjet printing heads and/or nozzles).

In some embodiments, this temperature is about 70° C.

In some of any of the embodiments described herein, the multifunctional curable material is characterized by a flash point of at least 80° C., and preferably higher, for example, of 85, 90, 95 higher, e.g., of at least 95, at least 100, at least 110, at least 120, ° C., or higher.

In some of any of the embodiments described herein, the multifunctional curable material is characterized by a viscosity, at room temperature, of less than 15 centipoises or less than 10 centipoises; and by a flash point of at least 80° C., as defined herein.

In some of any of the embodiments described herein, the multifunctional curable material comprises two or more polymerizable moieties linked to one another via a hydrocarbon chain, as defined herein.

The hydrocarbon chain can comprise a total of 1-40 atoms. In some embodiments, the hydrocarbon chain is a lower chain, comprising from 1 to 20, or from 2 to 10, or from 2 to 8, or from 2 to 8, carbon atoms, optionally interrupted by 1-4 heteroatoms.

In some embodiments, the hydrocarbon chain consists of carbon atoms.

In some embodiments, the hydrocarbon chain comprises, or consists of, an alkyl, a cycloalkyl, an aryl, an alkaryl, or any combination thereof.

In embodiments where the multifunctional curable material is a tri-functional or tetra-functional curable material, the hydrocarbon can be a branching unit, as defined herein.

In some of any of the embodiments described herein, the multifunctional curable material is a difunctional curable material.

Exemplary difunctional curable materials, which are usable in the context of the present embodiments, are collectively represented by Formula II:

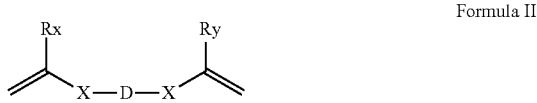

Formula II wherein:
X is selected from —O— and —O—C(=O)—;
D is a hydrocarbon as defined herein in any of the respective embodiments; and
Rx and Ry are each independently selected from hydrogen, alkyl and cycloalkyl.

When X is O, the difunctional curable material is a divinyl ether.

When X is —O—C(=O)— the difunctional curable material is a di(meth)acrylate.

When X is —O—C(=O)— and Rx and Ry are each hydrogen, the difunctional material is a diacrylate.

When X is —O—C(=O)— and Rx and Ry are each methyl, the difunctional material is a dimethacrylate.

In some of any of the embodiments described herein, the difunctional curable material is a divinyl ether as depicted in Formula II.

In some of any of the embodiments described herein, the difunctional curable material is a dimethacrylate as depicted in Formula II.

Without being bound by any particular theory, it is assumed that curable materials, which are characterized by lower polymerization rate when exposed to curing condition, are preferred.

In some of any of the embodiments defined herein, the hydrocarbon is or comprises a rigid moiety, for example, a cyclic moiety such as a cycloalkyl (an alicyclic moiety) and/or an aryl (e.g., phenyl) or alkaryl (e.g., benzyl).

According to some of any of the embodiments described herein, a weight ratio between the polyimide precursor and the multifunctional curable material is in the range of from 50:50 to 99:1, or from 50:50 to 90:10, or from 60:40 to 90:10, or from 70:20 to 90:10 or from 80:20 to 90:10. In some embodiments, the weight ratio is 80:20.

In some of any of the embodiments described herein, the amount of the multifunctional curable material in the formulation containing same (which comprises a polyimide precursor) is no more than 25 weight percents.

In some of any of the embodiments described herein, the amount of the multifunctional material in the formulation containing same (which comprises a polyimide precursor) is no more than 25, or no more than 20, parts by weight relative to 100 parts by weight of the polyimide precursor.

According to some of any of the embodiments described herein, the formulation is devoid of an organic solvent, as defined herein; the formulation is devoid of a bis-allyl-nadi-imide compound, as defined herein; and an amount of the multifunctional curable material in is less than 25 weight percents of the total weight of the formulation.

According to some of any of the embodiments described herein, there is provided a formulation system which comprises one or more of the modeling material formulation(s) comprising a polyimide precursor as described herein and one or more additional modeling material formulations, which comprise one or more additional curable material(s) and is/are devoid of a polyimide precursor. The curable material(s) in these additional formulations can be a mono-functional curable material, a multi-functional curable material, or a mixture thereof, and each material can be a monomer, an oligomer or a polymer, or a combination thereof, and is not necessarily a multifunctional curable material as defined herein Preferably, but not obligatory, the additional curable material is polymerizable when exposed to the same curing condition (e.g., curing energy) at which the polyimide precursor and/or the multifunctional curable material of the present embodiments is polymerizable, for example, upon exposure to irradiation (e.g., UV-vis irradiation).

In some embodiments, the additional curable material is a mono-functional acrylate or methacrylate ((meth)acrylate). Non-limiting examples include isobornyl acrylate (IBOA), isobornylmethacrylate, acryloyl morpholine (ACMO), phenoxyethyl acrylate, marketed by Sartomer Company (USA) under the trade name SR-339, urethane acrylate oligomer such as marketed under the name CN 131B, and any other acrylates and methacrylates usable in AM methodologies (e.g. in 3D inkjet printing).

In some embodiments, the additional curable material is a multi-functional acrylate or methacrylate ((meth)acrylate). Non-limiting examples of multi-functional (meth)acrylates include propoxylated (2) neopentyl glycol diacrylate, marketed by Sartomer Company (USA) under the trade name SR-9003, Ditrimethylolpropane Tetra-acrylate (DiTMPTTA), Pentaerythitol Tetra-acrylate (TETTA), and Dipentaerythitol Penta-acrylate (DiPEP), and an aliphatic urethane diacrylate, for example, such as marketed as Ebecryl 230. Non-limiting examples of multi-functional (meth) acrylate oligomers include ethoxylated or methoxylated polyethylene glycol diacrylate or dimethacrylate, ethoxylated bisphenol A diacrylate, polyethylene glycol-polyethylene glycol urethane diacrylate, a partially acrylated polyol oligomer, polyester-based urethane diacrylates such as marketed as CN991.

In some of any of the embodiments described herein, one or more of the modeling material formulation(s) further comprises an initiator, for initiating polymerization of the curable materials.

When all curable materials (polyimide precursor, multifunctional curable material as described herein and additional curable material, if present) are photopolymerizable (e.g., UV-curable), a photoinitiator is usable in these embodiments.

Non-limiting examples of suitable photoinitiators include benzophenones (aromatic ketones) such as benzophenone, methyl benzophenone, Michler's ketone and xanthones; acylphosphine oxide type photo-initiators such as 2,4,6-trimethylbenzolydiphenyl phosphine oxide (TMPO), 2,4,6-trimethylbenzoylethoxyphenyl phosphine oxide (TEPO), and bisacylphosphine oxides (BAPO's); benzoins and bezoin alkyl ethers such as benzoin, benzoin methyl ether and benzoin isopropyl ether and the like. Examples of photoinitiators are alpha-amino ketone, bisacylphosphine oxide (BAPO's), and those marketed under the tradename Irgacure®.

A photo-initiator may be used alone or in combination with a co-initiator. Benzophenone is an example of a photoinitiator that requires a second molecule, such as an amine, to produce a free radical. After absorbing radiation, benzophenone reacts with a ternary amine by hydrogen abstraction, to generate an alpha-amino radical, which initiates polymerization of acrylates. Non-limiting example of a class of co-initiators are alkanolamines such as triethylamine, methyldiethanolamine and triethanolamine.

A concentration of a photoinitiator in a formulation containing same may range from about 0.1 to about 5 weight percents, or from about 1 to about 5 weight percents, including any intermediate value and subranges therebetween.

According to some of any of the embodiments described herein, one or more of the modeling material formulation(s) further comprises a curable or non-curable material that chemically interacts with the polyimide precursor (e.g., via Michael addition or Diels-Alder reaction, as described herein). As exemplary such material is a polyamine or a polyamine precursor.

In some of any of the embodiments described herein, a modeling material formulation can further comprise one or more additional materials, which are referred to herein also as non-reactive materials.

Such agents include, for example, surface active agents, stabilizers, antioxidants, fillers, pigments, dispersants, and/or impact modifying agents (toughening agents or toughness modifiers).

In cases of multi-jetting methodologies, the non-reactive agents can be independently included in one or all of the modeling material formulations.

The term "filler" describes an inert material that modifies the properties of a polymeric material and/or adjusts a quality of the end products. The filler may be an inorganic particle, for example calcium carbonate, silica, and clay.

Fillers may be added to the modeling formulation in order to reduce shrinkage during polymerization or during cooling, for example, to reduce the coefficient of thermal expansion, increase strength, increase thermal stability, reduce cost and/or adopt rheological properties. Nanoparticles fillers are typically useful in applications requiring low viscosity such as ink-jet applications.

In some embodiments, a modeling formulation comprises a surface active agent. A surface-active agent may be used to reduce the surface tension of the formulation to the value required for jetting or for printing process, which is typically between 10 dyne/cm and 50 dyne/cm, for instance about 30 dyne/cm. An exemplary such agent is a silicone surface additive.

Suitable stabilizers (stabilizing agents) include, for example, thermal stabilizers, which stabilize the formulation at high temperatures.

In some embodiments, the modeling formulation comprises one or more pigments. In some embodiments, the pigment's concentration is lower than 35%, or lower than 25% or lower than 15%, by weight.

The pigment may be a white pigment. The pigment may be an organic pigment or an inorganic pigment, or a metal pigment or a combination thereof.

In some embodiments, the modeling formulation further comprises a dye.

In some embodiments, combinations of white pigments and dyes are used to prepare colored cured materials.

The dye may be any of a broad class of solvent soluble dyes. Some non-limiting examples are azo dyes, which are yellow, orange, brown and red; anthraquinone and triarylmethane dyes which are green and blue; and azine dye which is black.

In some of any of the embodiments described herein, one or more of the modeling material formulations comprises a toughening agent.

Non-limiting examples of toughening agents include elastomeric materials. Representative examples include, without limitation, natural rubber, butyl rubber, polyisoprene, polybutadiene, polyisobutylene, ethylene-propylene copolymer, styrene-butadiene-styrene triblock rubber, random styrene-butadiene rubber, styrene-isoprene-styrene triblock rubber, styrene-ethylene/butylene-styrene copolymer, styrene-ethylene/propylene-styrene copolymer, ethylene-propylene-diene terpolymers, ethylene-vinyl acetate and nitrile rubbers. Preferred agents are elastomers such as polybutadienes. Toughening agents such as elastomeric materials can be added to the formulation by incorporating in a modeling material formulation an elastomeric material in a dispersed/dissolved phase.

A concentration of elastomeric materials may range from about 0.10 phr to about 10 phr, or from about 0.1 phr to about 5 phr, relative to the weight of the formulation containing same.

A concentration of elastomeric materials may alternatively range from about 0.1% to about 20%, by weight, of the total weight of a formulation containing same.

Other impact modifying agents, such as, for example, carbon fibers, carbon nanotubes, glass fibers, aramid Kevlar, polyparaphenylene benzobisoxazole Zylon, and other polar and non-polar impact modifiers, are also contemplated.

Photo-curing can be done by UV sources, such as Xe lamp, mercury lamp, LED UV lamp, intense pulsed light (IPL), or UV laser, with intensity of up to 2000 $J/cm^2$ in the UV-VIS spectral range.

Thermal curing can be done by UV-VIS radiation or conduction, for example by using IR lamp, and/or heating of the printed surface by heating of the printing tray or the environment in the chamber.

Thermal curing can be enhanced by addition of peroxide catalyst, such as dicumyl peroxide (added at 0.01-2 wt. %) or thermo epoxy catalyst, such as tertiary amines, imidazoles and alcohols.

According to some of any of the embodiments described herein, a formulation comprising a polyimide precursor, as described herein, or a formulation system comprising said formulation, is for use and/or is identified for use in additive manufacturing of a three-dimensional object which comprises, in at least a portion thereof, a polyimide material, as defined herein.

Kits:

In some of any of the embodiments described herein there is provided a kit comprising the modeling material formulation(s) or the formulation system, as described herein in any of the respective embodiments and any combination thereof.

In some embodiments, when the kit comprises two or more modeling material formulations, or a formulation system comprising two or more formulations, each formulation is packaged individually in the kit.

In some embodiments, the formulation or formulation system further comprises a photoinitiator as described herein, and in some of these embodiments, the photoinitiator is packaged individually within the kit, that is, separately from other components of the formulation or formulation system.

In exemplary embodiments, the formulation(s) are packaged within the kit in a suitable packaging material, preferably, an impermeable material (e.g., water- and gas-impermeable material), and further preferably an opaque material. In some embodiments, the kit further comprises instructions to use the formulations in an additive manufacturing process, preferably a 3D inkjet printing process as described herein. The kit may further comprise instructions to use the formulations in the process in accordance with the method as described herein.

Figure 2A:
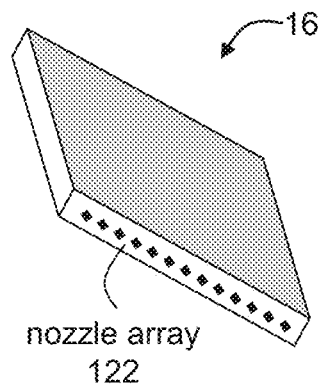
FIGS. 2A-2C are schematic illustrations of print heads according to some embodiments of the present invention.
Figure 2B:
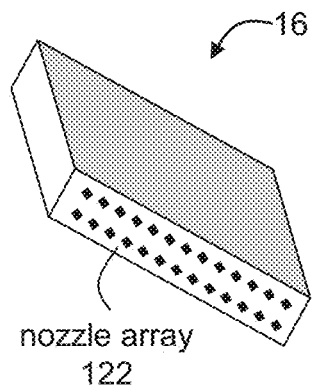
Figure 2C:
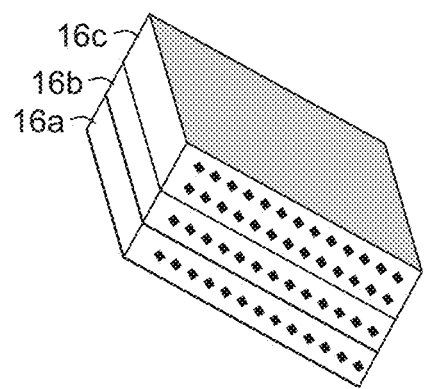

The System:

A representative and non-limiting example of a system 110 suitable for AM of an object 112 according to some embodiments of the present invention is illustrated in FIG. 1A. System 110 comprises an additive manufacturing apparatus 114 having a dispensing unit 16 which comprises a plurality of dispensing (e.g., printing) heads. Each head preferably comprises an array of one or more nozzles 122, as illustrated in FIGS. 2A-C described below, through which a liquid building material formulation 124 is dispensed.

Preferably, but not obligatorily, apparatus 114 is a three-dimensional printing apparatus, in which case the dispensing heads are printing heads, and the building material formulation is dispensed via inkjet technology. This need not necessarily be the case, since, for some applications, it may not be necessary for the additive manufacturing apparatus to employ three-dimensional printing techniques. Representative examples of additive manufacturing apparatus contemplated according to various exemplary embodiments of the present invention include, without limitation, fused deposition modeling apparatus and fused material formulation deposition apparatus.

The term "printing head" as used herein represents a dispensing head usable in 3D printing such as 3D inkjet printing.

The terms "print head", "printhead" and "printing head" are used herein interchangeably, and represent a dispensing head usable in 3D printing such as 3D inkjet printing.

The term "dispensing head" encompasses "printing head".

Each dispensing (e.g., printing) head is optionally and preferably fed via one or more building material formulation reservoirs which may optionally include a temperature control unit (e.g., a temperature sensor and/or a heating device), and a material formulation level sensor. To dispense the building material formulation, a voltage signal is applied to the dispensing heads to selectively deposit droplets of a material formulation via the dispensing (e.g., printing) head nozzles, for example, as in piezoelectric inkjet printing technology. The dispensing rate of each head depends on the number of nozzles, the type of nozzles and the applied voltage signal rate (frequency). Such dispensing heads are known to those skilled in the art of solid freeform fabrication.

Preferably, but not obligatorily, the overall number of dispensing nozzles or nozzle arrays is selected such that half of the dispensing nozzles are designated to dispense support material formulation and half of the dispensing nozzles are designated to dispense modeling material formulation, i.e. the number of nozzles jetting modeling material formulations is the same as the number of nozzles jetting support material formulation. In the representative example of FIG. 1A, four dispensing heads 16a, 16b, 16c and 16d are illustrated. Each of heads 16a, 16b, 16c and 16d has a nozzle array. In this Example, heads 16a and 16b can be designated for modeling material formulation/s and heads 16c and 16d can be designated for support material formulation. Thus, head 16a can dispense a first modeling material formulation, head 16b can dispense a second modeling material formulation and heads 16c and 16d can both dispense support material formulation. In an alternative embodiment, heads 16c and 16d, for example, may be combined in a single head having two nozzle arrays for depositing support material formulation. In a further alternative embodiment any one or more of the printing heads may have more than one nozzle arrays for depositing more than one material formulation, e.g. two nozzle arrays for depositing two different modeling material formulations or a modeling material formulation and a support material formulation, each formulation via a different array or number of nozzles.

Yet it is to be understood that it is not intended to limit the scope of the present invention and that the number of modeling material formulation depositing heads (modeling heads) and the number of support material formulation depositing heads (support heads) may differ. Generally, the number of arrays of nozzles that dispense modeling material formulation, the number of arrays of nozzles that dispense support material formulation, in each respective array are selected such as to provide a predetermined ratio, a, between the maximal dispensing rate of the support material formulation and the maximal dispensing rate of modeling material formulation. The value of the predetermined ratio, a, is preferably selected to ensure that in each formed layer, the height of modeling material formulation equals the height of support material formulation. Typical values for a are from about 0.6 to about 1.5.

For example, for a=1, the overall dispensing rate of support material formulation is generally the same as the overall dispensing rate of the modeling material formulation when all the arrays of nozzles operate.

For example, apparatus 114 can comprise M modeling heads each having m arrays of p nozzles, and S support heads each having s arrays of q nozzles such that M×m×p=S×s×q. Each of the M×m modeling arrays and S×s support arrays can be manufactured as a separate physical unit, which can be assembled and disassembled from the group of arrays. In this embodiment, each such array optionally and preferably comprises a temperature control unit and a material formulation level sensor of its own, and receives an individually controlled voltage for its operation.

Apparatus 114 can further comprise a solidifying device 324 which can include any device configured to emit light, heat or the like that may cause the deposited material formulation to harden. For example, solidifying device 324 can comprise one or more radiation sources, which can be, for example, an ultraviolet or visible or infrared lamp, or other sources of electromagnetic radiation, or electron beam source, depending on the modeling material formulation being used. In some embodiments of the present invention, solidifying device 324 serves for curing or solidifying the modeling material formulation.

In some embodiments of the present invention apparatus 114 comprises cooling system 134 such as one or more fans or the like.

The dispensing (e.g., printing) head and radiation source are preferably mounted in a frame or block 128 which is preferably operative to reciprocally move over a tray 360, which serves as the working surface. In some embodiments of the present invention, the radiation sources are mounted in the block such that they follow in the wake of the dispensing heads to at least partially cure or solidify the material formulations just dispensed by the dispensing heads. Tray 360 is positioned horizontally. According to the common conventions an X-Y-Z Cartesian coordinate system is selected such that the X-Y plane is parallel to tray 360. Tray 360 is preferably configured to move vertically (along the Z direction), typically downward. In various exemplary embodiments of the invention, apparatus 114 further comprises one or more leveling devices 132, e.g. a roller 326. Leveling device 326 serves to straighten, level and/or establish a thickness of the newly formed layer prior to the formation of the successive layer thereon. Leveling device 326 preferably comprises a waste collection device 136 for collecting the excess material formulation generated during leveling. Waste collection device 136 may comprise any mechanism that delivers the material formulation to a waste tank or waste cartridge.

In use, the dispensing heads of unit 16 move in a scanning direction, which is referred to herein as the X direction, and selectively dispense building material formulation in a predetermined configuration in the course of their passage over tray 360. The building material formulation typically comprises one or more types of support material formulation and one or more types of modeling material formulation. The passage of the dispensing heads of unit 16 is followed by the curing of the modeling material formulation(s) by radiation source 126. In the reverse passage of the heads, back to their starting point for the layer just deposited, an additional dispensing of building material formulation may be carried out, according to predetermined configuration. In the forward and/or reverse passages of the dispensing heads, the layer thus formed may be straightened by leveling device 326, which preferably follows the path of the dispensing heads in their forward and/or reverse movement. Once the dispensing heads return to their starting point along the X direction, they may move to another position along an indexing direction, referred to herein as the Y direction, and continue to build the same layer by reciprocal movement along the X direction. Alternately, the dispensing heads may move in the Y direction between forward and reverse movements or after more than one forward-reverse movement. The series of scans performed by the dispensing heads to complete a single layer is referred to herein as a single scan cycle.

Once the layer is completed, tray 360 is lowered in the Z direction to a predetermined Z level, according to the desired thickness of the layer subsequently to be printed. The procedure is repeated to form three-dimensional object 112 in a layerwise manner.

In another embodiment, tray 360 may be displaced in the Z direction between forward and reverse passages of the dispensing head of unit 16, within the layer. Such Z displacement is carried out in order to cause contact of the leveling device with the surface in one direction and prevent contact in the other direction.

System 110 optionally and preferably comprises a building material formulation supply system 330, which comprises the building material formulation containers or cartridges and supplies a plurality of building material formulations to fabrication apparatus 114.

A control unit 152 controls fabrication apparatus 114 and optionally and preferably also supply system 330. Control unit 152 typically includes an electronic circuit configured to perform the controlling operations. Control unit 152 preferably communicates with a data processor 154, which transmits digital data pertaining to fabrication instructions based on computer object data, e.g., a CAD configuration represented on a computer readable medium in a form of a Standard Tessellation Language (STL) format or the like. Typically, control unit 152 controls the voltage applied to each dispensing head or each nozzle array and the temperature of the building material formulation in the respective printing head or respective nozzle array.

Once the manufacturing data is loaded to control unit 152 it can operate without user intervention. In some embodiments, control unit 152 receives additional input from the operator, e.g., using data processor 154 or using a user interface 116 communicating with unit 152. User interface 116 can be of any type known in the art, such as, but not limited to, a keyboard, a touch screen and the like. For example, control unit 152 can receive, as additional input, one or more building material formulation types and/or attributes, such as, but not limited to, color, characteristic distortion and/or transition temperature, viscosity, electrical property, magnetic property. Other attributes and groups of attributes are also contemplated.

Figure 1B:
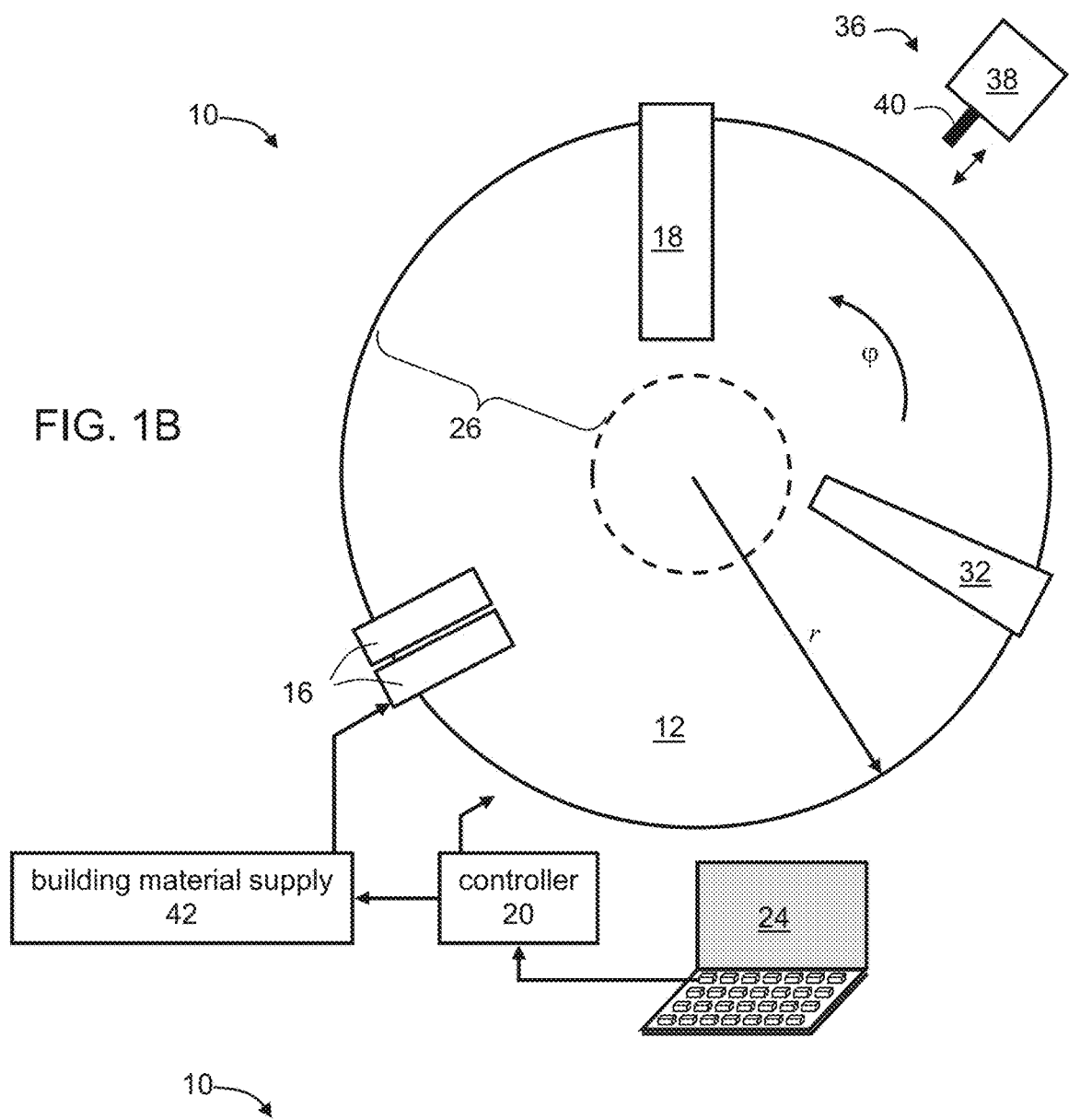
Figure 1C:
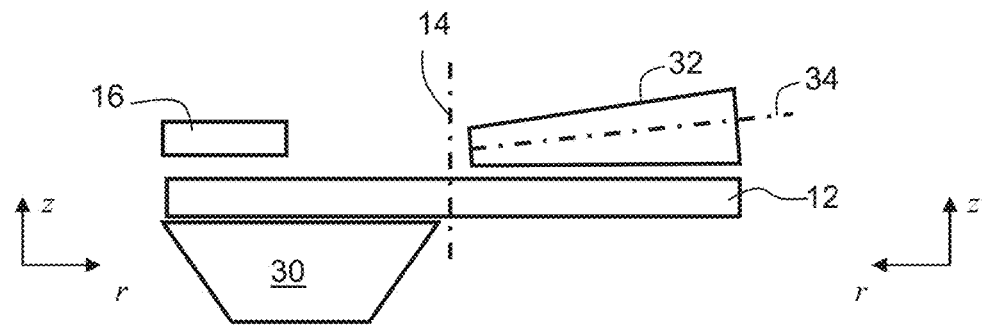
Figure 1D:
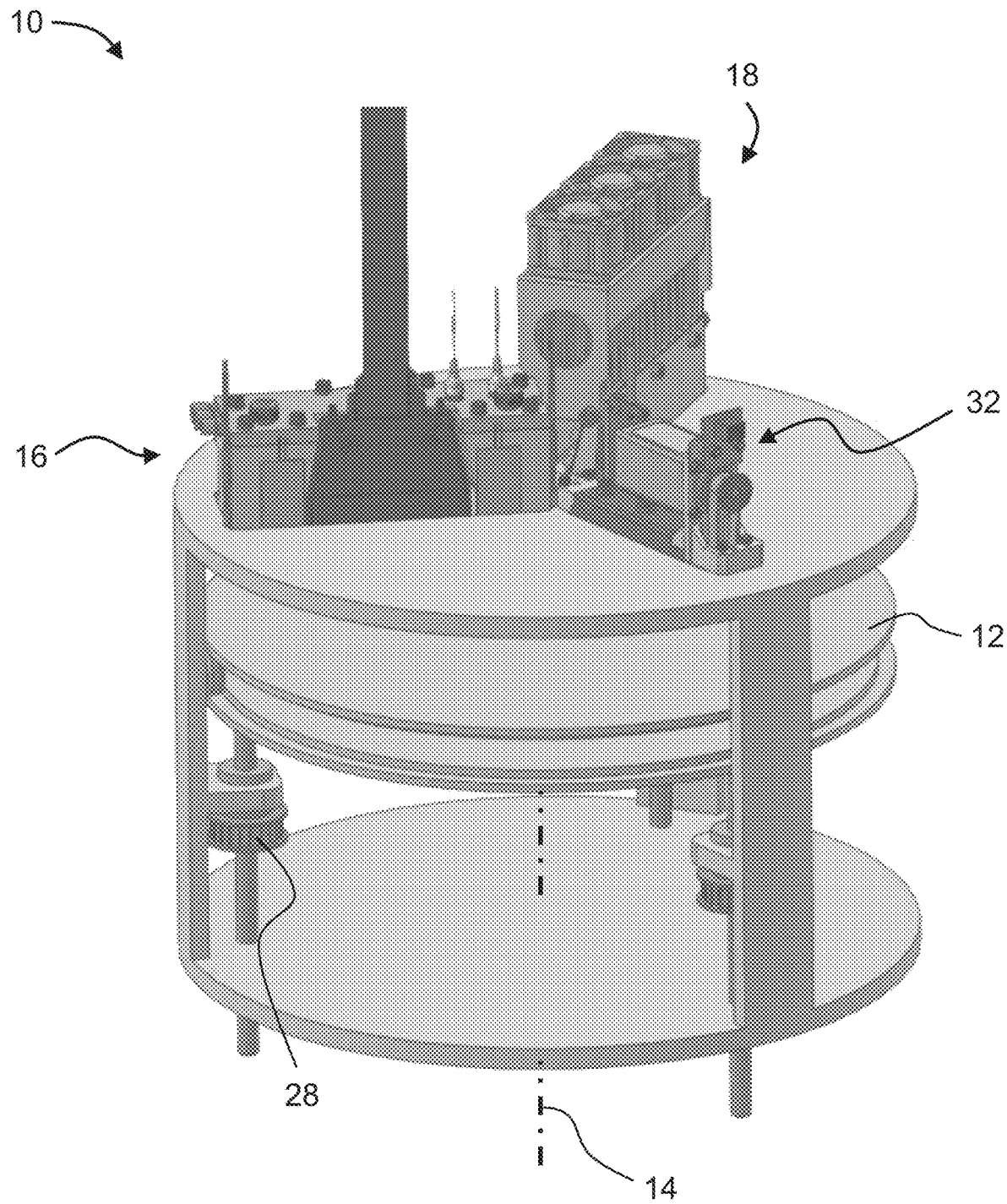

Another representative and non-limiting example of a system 10 suitable for AM of an object according to some embodiments of the present invention is illustrated in FIGS. 1B-D. FIGS. 1B-D illustrate a top view (FIG. 1B), a side view (FIG. 1C) and an isometric view (FIG. 1D) of system 10.

In the present embodiments, system 10 comprises a tray 12 and a plurality of inkjet printing heads 16, each having one or more arrays of nozzles with respective one or more pluralities of separated nozzles. Tray 12 can have a shape of a disk or it can be annular. Non-round shapes are also contemplated, provided they can be rotated about a vertical axis.

Tray 12 and heads 16 are optionally and preferably mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While the embodiments below are described with a particular emphasis to configuration (i) wherein the tray is a rotary tray that is configured to rotate about vertical axis 14 relative to heads 16, it is to be understood that the present application contemplates also configurations (ii) and (iii). Any one of the embodiments described herein can be adjusted to be applicable to any of configurations (ii) and (iii), and one of ordinary skills in the art, provided with the details described herein, would know how to make such adjustment.

In the following description, a direction parallel to tray 12 and pointing outwardly from axis 14 is referred to as the radial direction r, a direction parallel to tray 12 and perpendicular to the radial direction r is referred to herein as the azimuthal direction $\varphi$, and a direction perpendicular to tray 12 is referred to herein is the vertical direction z.

The term "radial position," as used herein, refers to a position on or above tray 12 at a specific distance from axis 14. When the term is used in connection to a printing head, the term refers to a position of the head, which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 14 at a specific point.

Tray 12 serves as a supporting structure for three-dimensional printing. The working area on which one or objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 1B tray replacement device 36 is illustrated as a drive 38 with a movable arm 40 configured to pull tray 12, but other types of tray replacement devices are also contemplated.

Exemplified embodiments for the printing head 16 are illustrated in FIGS. 2A-2C. These embodiments can be employed for any of the AM systems described above, including, without limitation, system 110 and system 10.

FIGS. 2A-B illustrate a printing head 16 with one (FIG. 2A) and two (FIG. 2B) nozzle arrays 22. The nozzles in the array are preferably aligned linearly, along a straight line. In embodiments in which a particular printing head has two or more linear nozzle arrays, the nozzle arrays are optionally and preferably can be parallel to each other. When a printing head has two or more arrays of nozzles (e.g., FIG. 2B) all arrays of the head can be fed with the same building material formulation, or at least two arrays of the same head can be fed with different building material formulations.

When a system similar to system 110 is employed, all printing heads 16 are optionally and preferably oriented along the indexing direction with their positions along the scanning direction being offset to one another.

When a system similar to system 10 is employed, all printing heads 16 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position $\varphi_1$, and another head can be oriented radially and positioned at azimuthal position $\varphi_2$. In this example, the azimuthal offset between the two heads is $\varphi_1-\varphi_2$, and the angle between the linear nozzle arrays of the two heads is also $\varphi_1-\varphi_2$.

In some embodiments, two or more printing heads can be assembled to a block of printing heads, in which case the printing heads of the block are typically parallel to each other. A block including several inkjet printing heads 16a, 16b, 16c is illustrated in FIG. 2C.

In some embodiments, system 10 comprises a support structure 30 positioned below heads 16 such that tray 12 is between support structure 30 and heads 16. Support structure 30 may serve for preventing or reducing vibrations of tray 12 that may occur while inkjet printing heads 16 operate. In configurations in which printing heads 16 rotate about axis 14, support structure 30 preferably also rotates such that support structure 30 is always directly below heads 16 (with tray 12 between heads 16 and tray 12).

Tray 12 and/or printing heads 16 is optionally and preferably configured to move along the vertical direction z, parallel to vertical axis 14 so as to vary the vertical distance between tray 12 and printing heads 16. In configurations in which the vertical distance is varied by moving tray 12 along the vertical direction, support structure 30 preferably also moves vertically together with tray 12. In configurations in which the vertical distance is varied by heads 16 along the vertical direction, while maintaining the vertical position of tray 12 fixed, support structure 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layerwise manner.

The operation of dispending (e.g., inkjet printing) heads 16 and optionally and preferably also of one or more other components of system 10, e.g., the motion of tray 12, are controlled by a controller 20. The controller can have an electronic circuit and a non-volatile memory medium readable by the circuit, wherein the memory medium stores program instructions which, when read by the circuit, cause the circuit to perform control operations as further detailed below.

Controller 20 can also communicate with a host computer 24 which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD). The object data formats are typically structured according to a Cartesian system of coordinates. In these cases, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20.

The transformation of coordinates allows three-dimensional printing over a rotating tray. In non-rotary systems with a stationary tray with the printing heads typically reciprocally move above the stationary tray along straight lines. In such systems, the printing resolution is the same at any point over the tray, provided the dispensing rates of the heads are uniform. In system 10, unlike non-rotary systems, not all the nozzles of the head points cover the same distance over tray 12 during at the same time. The transformation of coordinates is optionally and preferably executed so as to ensure equal amounts of excess material formulation at different radial positions. Representative examples of coordinate transformations according to some embodiments of the present invention are provided in FIGS. 3A-B, showing three slices of an object (each slice corresponds to fabrication instructions of a different layer of the objects), where FIG. 3A illustrates a slice in a Cartesian system of coordinates and FIG. 3B illustrates the same slice following an application of a transformation of coordinates procedure to the respective slice.

Typically, controller 20 controls the voltage applied to the respective component of the system 10 based on the fabrication instructions and based on the stored program instructions as described below.

Generally, controller 20 controls printing heads 16 to dispense, during the rotation of tray 12, droplets of building material formulation in layers, such as to print a three-dimensional object on tray 12.

System 10 optionally and preferably comprises one or more radiation sources 18, which can be, for example, an ultraviolet or visible or infrared lamp, or other sources of electromagnetic radiation, or electron beam source, depending on the modeling material formulation being used. Radiation source can include any type of radiation emitting device, including, without limitation, light emitting diode (LED), digital light processing (DLP) system, resistive lamp and the like. Radiation source 18 serves for curing or solidifying the modeling material formulation. In various exemplary embodiments of the invention the operation of radiation source 18 is controlled by controller 20 which may activate and deactivate radiation source 18 and may optionally also control the amount of radiation generated by radiation source 18.

In some embodiments of the invention, system 10 further comprises one or more leveling devices 32 which can be manufactured as a roller or a blade. Leveling device 32 serves to straighten the newly formed layer prior to the formation of the successive layer thereon. In some embodiments, leveling device 32 has the shape of a conical roller positioned such that its symmetry axis 34 is tilted relative to the surface of tray 12 and its surface is parallel to the surface of the tray. This embodiment is illustrated in the side view of system 10 (FIG. 1C).

The conical roller can have the shape of a cone or a conical frustum.

The opening angle of the conical roller is preferably selected such that is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1/R_2=(R-h)/h$ and wherein R is the farthest distance of the roller from axis 14 (for example, R can be the radius of tray 12).

The operation of leveling device 32 is optionally and preferably controlled by controller 20 which may activate and deactivate leveling device 32 and may optionally also control its position along a vertical direction (parallel to axis 14) and/or a radial direction (parallel to tray 12 and pointing toward or away from axis 14.

In some embodiments of the present invention printing heads 16 are configured to reciprocally move relative to tray along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20.

Some embodiments contemplate the fabrication of an object by dispensing different formulations from different arrays of nozzles (belonging to the same or different printing head). For example, the fabrication comprises dispensing a first formulation from a first array of nozzles, and dispensing a second formulation from a second array of nozzles. In some embodiments, the first and the second arrays of nozzles are of the same printing head. In some embodiments, the first and the second arrays of nozzles are of separate printing heads. In some of these embodiments, the first and second formulations are different modeling material formulations that form a formulation system as described herein.

These embodiments provide, inter alia, the ability to select material formulations from a given number of material formulations and define desired combinations of the selected material formulations and their properties. According to the present embodiments, the spatial locations of the deposition of each material formulation with the layer is defined, either to effect occupation of different three-dimensional spatial locations by different material formulations, or to effect occupation of substantially the same three-dimensional location or adjacent three-dimensional locations by two or more different material formulations so as to allow post deposition spatial combination of the material formulations within the layer, thereby to form a composite material formulation at the respective location or locations.

Any post deposition combination or mix of modeling material formulations is contemplated. For example, once a certain material formulation is dispensed it may preserve its original properties. However, when it is dispensed simultaneously with another modeling material formulation or other dispensed material formulations which are dispensed at the same or nearby locations, a composite material formulation having a different property or properties to the dispensed material formulations is formed.

The present embodiments thus enable the deposition of a broad range of material formulation combinations, and the fabrication of an object which may consist of multiple different combinations of material formulations, in different parts of the object, according to the properties desired to characterize each part of the object.

Further details on the principles and operations of an AM system suitable for the present embodiments are found in U.S. Published Application No. 20100191360, the contents of which are hereby incorporated by reference.

The Method:

FIG. 4 presents a flowchart describing an exemplary method according to some embodiments of the present invention.

It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

Computer programs implementing the method of the present embodiments can commonly be distributed to users on a distribution medium such as, but not limited to, a floppy disk, a CD-ROM, a flash memory device and a portable hard drive. From the distribution medium, the computer programs can be copied to a hard disk or a similar intermediate storage medium. The computer programs can be run by loading the computer instructions either from their distribution medium or their intermediate storage medium into the execution memory of the computer, configuring the computer to act in accordance with the method of this invention. All these operations are well-known to those skilled in the art of computer systems.

The computer implemented method of the present embodiments can be embodied in many forms. For example, it can be embodied in on a tangible medium such as a computer for performing the method operations. It can be embodied on a computer readable medium, comprising computer readable instructions for carrying out the method operations. In can also be embodied in electronic device having digital computer capabilities arranged to run the computer program on the tangible medium or execute the instruction on a computer readable medium.

The method begins at 200 and optionally and preferably continues to 201 at which computer object data (e.g., 3D printing data) corresponding to the shape of the object are received. The data can be received, for example, from a host computer which transmits digital data pertaining to fabrication instructions based on computer object data, e.g., in a form of STL, SLC format, VRML, AMF format, DXF, PLY or any other format suitable for CAD.

The method continues to 202 at which droplets of the uncured building material as described herein (e.g., one or more modeling material formulations as described herein and optionally a support material formulation) are dispensed in layers, on a receiving medium, optionally and preferably using an AM system, such as, but not limited to, system 110 or system 10, according to the computer object data (e.g., printing data), and as described herein. In some embodiments, the AM system is a 3D inkjet printing system, e.g., as described herein. In any of the embodiments described herein the dispensing 202 is by at least two different multi-nozzle inkjet printing heads and/or by at least two different nozzle arrays. The receiving medium can be a tray of an AM system (e.g., tray 360 or 12) as described herein or a previously deposited layer.

In some embodiments of the present invention, the dispensing 202 is effected under ambient environment.

Optionally, before being dispensed, the uncured building material, or a part thereof (e.g., one or more formulations of the building material), is heated, prior to being dispensed. These embodiments are particularly useful for uncured building material formulations having relatively high viscosity at the operation temperature of the working chamber of a 3D inkjet printing system. The heating of the formulation(s) is preferably to a temperature that allows jetting the respective formulation through a nozzle of a printing head of a 3D inkjet printing system. In some embodiments of the present invention, the heating is to a temperature at which the respective formulation exhibits a viscosity as described herein in any of the respective embodiments.

The heating can be executed before loading the respective formulation into the printing head of the AM (e.g., 3D inkjet printing) system, or while the formulation is in the printing head or while the composition passes through the nozzle of the printing head.

In some embodiments, the heating is executed before loading of the respective formulation into the dispensing (e.g., inkjet printing) head, so as to avoid clogging of the dispensing (e.g., inkjet printing) head by the formulation in case its viscosity is too high.

In some embodiments, the heating is executed by heating the dispensing (e.g., inkjet printing) heads, at least while passing the modeling material formulation(s) through the nozzle of the dispensing (e.g., inkjet printing) head.

Once the uncured building material is dispensed on the receiving medium according to the computer object data (e.g., printing data), the method optionally and preferably continues to 203 at which a curing condition (e.g., curing energy) is applied to the deposited layers, e.g., by means of a radiation source as described herein. Preferably, the curing is applied to each individual layer following the deposition of the layer and prior to the deposition of the previous layer.

In some embodiments, applying a curing energy is effected under a generally dry and inert environment, as described herein.

The method ends at 204.

In some embodiments, the method is executed using an exemplary system as described herein in any of the respective embodiments and any combination thereof.

The modeling material formulation(s) can be contained in a particular container or cartridge of a solid freeform fabrication apparatus or a combination of modeling material formulations deposited from different containers of the apparatus.

In some embodiments, at least one, or at least a few (e.g., at least 10, at least 20, at least 30 at least 40, at least 50, at least 60, at least 80, or more), or all, of the layers is/are formed by dispensing droplets, as in 202, of a single modeling material formulation, as described herein in any of the respective embodiments.

In some embodiments, at least one, or at least a few (e.g., at least 10, at least 20, at least 30 at least 40, at least 50, at least 60, at least 80, or more), or all, of the layers is/are formed by dispensing droplets, as in 202, of two or more modeling material formulations, as described herein in any of the respective embodiments, each from a different dispensing (e.g., inkjet printing) head or a different array of nozzles as described herein.

These embodiments provide, inter alia, the ability to select materials from a given number of materials and define desired combinations of the selected materials and their properties. According to the present embodiments, the spatial locations of the deposition of each material with the layer is defined, either to effect occupation of different three-dimensional spatial locations by different materials, or to effect occupation of substantially the same three-dimensional location or adjacent three-dimensional locations by two or more different materials so as to allow post deposition spatial combination of the materials within the layer, thereby to form a composite material at the respective location or locations.

Any post deposition combination or mix of modeling materials is contemplated. For example, once a certain material is dispensed it may preserve its original properties. However, when it is dispensed simultaneously with another modeling material or other dispensed materials which are dispensed at the same or nearby locations, a composite material having a different property or properties to the dispensed materials is formed.

Some of the embodiments thus enable the deposition of a broad range of material combinations, and the fabrication of an object which may consist of multiple different combinations of materials, in different parts of the object, according to the properties desired to characterize each part of the object.

In some of these embodiments, the two or more modeling material formulations are dispensed in a voxelated manner, wherein voxels of one of said modeling material formulations are interlaced with voxels of at least one another modeling material formulation.

Some embodiments thus provide a method of layerwise fabrication of a three-dimensional object, in which for each of at least a few (e.g., at least two or at least three or at least 10 or at least 20 or at least 40 or at least 80) of the layers or all the layers, two or more modeling formulations are dispensed, optionally and preferably using system 10 or system 110. Each modeling formulation is preferably dispensed by jetting it out of a plurality of nozzles of a printing head (e.g., head 16). The dispensing is in a voxelated manner, wherein voxels of one of said modeling material formulations are interlaced with voxels of at least one another modeling material formulation, according to a pre-determined voxel ratio.

Such a combination of two modeling material formulations at a predetermined voxel ratio is referred to as digital material (DM).

In some of any of the embodiments of the present invention, once the layers are dispensed as described herein, exposure to curing energy as described herein is effected. In some embodiments, the curable materials are UV-curable materials and the curing energy is such that the radiation source emits UV radiation.

In some embodiments, where the building material comprises also support material formulation(s), the method proceeds to removing the hardened support material. This can be performed by mechanical and/or chemical means, as would be recognized by any person skilled in the art.

In some of any of the embodiments described herein, the method further comprises exposing the cured modeling material, either before or after removal of a support material, if such has been included in the building material, to a post-treatment condition. The post-treatment condition is typically aimed at further hardening the cured modeling material. In some embodiments, the post-treatment hardens a partially-cured material to thereby obtain a completely cured material.

In some embodiments, the post-treatment is effected by exposure to heat or radiation, as described in any of the respective embodiments herein. In some embodiments, when the condition is heat (thermal post-treatment), the post-treatment can be effected for a time period that ranges from a few minutes (e.g., 10 minutes) to a few hours (e.g., 1-24 hours).

In some embodiments, the thermal post-treatment comprises exposing the object to heat of at least 100° C. for at least one hour.

In some embodiments, the thermal post treatment comprises gradual exposure of the object to heat of at least 200° C., e.g., 250° C. For example, the object is exposed to a first temperature (e.g., 100° C.) for a first time period, then to a second, higher temperature (e.g. 150° C. or 200° C.) for a second time period, then to a third, yet higher temperature (e.g., 200° C. or 250° C.), for a third time period. Each time period can be 10 minutes to 2 hours.

The Object:

Embodiments of the present invention provide three-dimensional objects comprising in at least a portion thereof a polyimide material, as defined herein.

According to some embodiments, the three-dimensional objects are prepared by an additive manufacturing utilizing a modeling material formulation which comprises a polyimide precursor, as described herein in any of the respective embodiments.

According to some embodiments, the three-dimensional objects are prepared by a method as described herein in any of the respective embodiments.

According to some embodiments, the three-dimensional object comprises, in at least a portion thereof, a polyimide material, as described herein in any of the respective embodiments.

According to some embodiments, those portions of the object which comprise a polyimide material are characterized by one or more of the following:

Storage Modulus (E') which is higher by at least 10% than a storage modulus of a portion of an object which is essentially consisted of a respective polyimide; and Glass transition temperature (Tg) which is higher by at least 10% than a storage modulus of a portion of an object, which is essentially consisted of a respective polyimide.

In the context of these embodiments, by "respective polyimide" it is meant a hardened material which is a result of polymerization of a polyimide precursor, without the presence of a multifunctional curable material as defined herein in respective embodiments. That is, a hardened material formed when a formulation comprising both a multifunctional curable material as described herein and a polyimide precursor, exhibits Storage Modulus and/or Tg which is higher than a hardened material formed when a formulation comprises a polyimide precursor as the only curable material.

For example, a polyimide material according to the present embodiments features a Storage Modulus of about 800 MPa, or even higher, whereby a storage modulus of a respective polyimide is about 700 MPa.

According to some embodiments, the polyimide material in the object is characterized by high HDT (as this term is defined herein), e.g., HDT higher than 100° C., or higher than 120° C., or higher than 150° C., and even higher.

According to some embodiments, the polyimide material in the object is devoid of an organic polar solvent, as defined herein.

As used herein and in the art, Storage Modulus (E') is defined according to ISO 6721-1, as representing a stiffness of a material as measured in dynamic mechanical analysis, and is proportional to the energy stored in a specimen during a loading cycle. In some embodiments, the Storage Modulus is determined as described in the Examples section that follows. In some embodiments, the Storage Modulus is determined according to ASTM D4605.

Herein, "Tg" refers to glass transition temperature defined as the location of the local maximum of the E" curve, where E" is the loss modulus of the material as a function of the temperature. Broadly speaking, as the temperature is raised within a range of temperatures containing the Tg temperature, the state of a material, particularly a polymeric material, gradually changes from a glassy state into a rubbery state.

Herein, "Tg range" is a temperature range at which the E" value is at least half its value (e.g., can be up to its value) at the Tg temperature as defined above.

Without wishing to be bound to any particular theory, it is assumed that the state of a polymeric material gradually changes from the glassy state into the rubbery within the Tg range as defined above. The lowest temperature of the Tg range is referred to herein as Tg(low) and the highest temperature of the Tg range is referred to herein as Tg(high).

In any of the embodiments described herein, the term "temperature higher than Tg" means a temperature that is higher than the Tg temperature, or, more preferably a temperature that is higher than Tg(high).

In some embodiments, the Tg is determined as described in the Examples section that follows.

As used herein, HDT refers to a temperature at which the respective material deforms under a predetermined load at some certain temperature. Suitable test procedures for determining the HDT of a material are the ASTM D-648 series, particularly the ASTM D-648-06 and ASTM D-648-07 methods. In some embodiments, HDT is determined at a pressure of 0.45 MPa.

As used herein throughout the term "about" refers to ±10% or ±5%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

Herein throughout, the term "(meth)acrylic" encompasses acrylic and methacrylic materials.

Herein throughout, the phrase "linking moiety" or "linking group" describes a group that connects two or more moieties or groups in a compound. A linking moiety is typically derived from a bi- or tri-functional compound, and can be regarded as a bi- or tri-radical moiety, which is connected to two or three other moieties, via two or three atoms thereof, respectively.

Exemplary linking moieties include a hydrocarbon moiety or chain, optionally interrupted by one or more heteroatoms, as defined herein, and/or any of the chemical groups listed below, when defined as linking groups.

When a chemical group is referred to herein as "end group" it is to be interpreted as a substituent, which is connected to another group via one atom thereof.

Herein throughout, the term "hydrocarbon" collectively describes a chemical group composed mainly of carbon and hydrogen atoms. A hydrocarbon can be comprised of alkyl, alkene, alkyne, aryl, and/or cycloalkyl, each can be substituted or unsubstituted, and can be interrupted by one or more heteroatoms. The number of carbon atoms can range from 2 to 30, and is preferably lower, e.g., from 1 to 10, or from 1 to 6, or from 1 to 4. A hydrocarbon can be a linking group or an end group.

Bisphenol A is an example of a hydrocarbon comprised of 2 aryl groups and one alkyl group. Dimethylenecyclohexane is an example of a hydrocarbon comprised of 2 alkyl groups and one cycloalkyl group.

As used herein, the term "amine" describes both a —NR'R" group and a —NR'— group, wherein R' and R" are each independently hydrogen, alkyl, cycloalkyl, aryl, as these terms are defined hereinbelow.

The amine group can therefore be a primary amine, where both R' and R" are hydrogen, a secondary amine, where R' is hydrogen and R" is alkyl, cycloalkyl or aryl, or a tertiary amine, where each of R' and R" is independently alkyl, cycloalkyl or aryl.

Alternatively, R' and R" can each independently be hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, carbonyl, C-carboxylate, O-carboxylate, N-thiocarbamate, O-thiocarbamate, urea, thiourea, N-carbamate, O-carbamate, C-amide, N-amide, guanyl, guanidine and hydrazine.

The term "amine" is used herein to describe a —NR'R" group in cases where the amine is an end group, as defined hereinunder, and is used herein to describe a —NR'— group in cases where the amine is a linking group or is or part of a linking moiety.

The term "alkyl" describes a saturated aliphatic hydrocarbon including straight chain and branched chain groups. Preferably, the alkyl group has 1 to 30, or 1 to 20 carbon atoms. Whenever a numerical range; e.g., "1-20", is stated herein, it implies that the group, in this case the alkyl group, may contain 1 carbon atom, 2 carbon atoms, 3 carbon atoms, etc., up to and including 20 carbon atoms. The alkyl group may be substituted or unsubstituted. Substituted alkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine.

The alkyl group can be an end group, as this phrase is defined hereinabove, wherein it is attached to a single adjacent atom, or a linking group, as this phrase is defined hereinabove, which connects two or more moieties via at least two carbons in its chain. When the alkyl is a linking group, it is also referred to herein as "alkylene" or "alkylene chain".

Alkene and Alkyne, as used herein, are an alkyl, as defined herein, which contains one or more double bond or triple bond, respectively.

The term "cycloalkyl" describes an all-carbon monocyclic ring or fused rings (i.e., rings which share an adjacent pair of carbon atoms) group where one or more of the rings does not have a completely conjugated pi-electron system. Examples include, without limitation, cyclohexane, adamantine, norbornyl, isobornyl, and the like. The cycloalkyl group may be substituted or unsubstituted. Substituted cycloalkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The cycloalkyl group can be an end group, as this phrase is defined hereinabove, wherein it is attached to a single adjacent atom, or a linking group, as this phrase is defined hereinabove, connecting two or more moieties at two or more positions thereof.

The term "heteroalicyclic" describes a monocyclic or fused ring group having in the ring(s) one or more atoms such as nitrogen, oxygen and sulfur. The rings may also have one or more double bonds. However, the rings do not have a completely conjugated pi-electron system. Representative examples are piperidine, piperazine, tetrahydrofurane, tetrahydropyrane, morpholino, oxalidine, and the like.

The heteroalicyclic may be substituted or unsubstituted. Substituted heteroalicyclic may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine. The heteroalicyclic group can be an end group, as this phrase is defined hereinabove, where it is attached to a single adjacent atom, or a linking group, as this phrase is defined hereinabove, connecting two or more moieties at two or more positions thereof.

The term "aryl" describes an all-carbon monocyclic or fused-ring polycyclic (i.e., rings which share adjacent pairs of carbon atoms) groups having a completely conjugated pi-electron system. The aryl group may be substituted or unsubstituted. Substituted aryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The aryl group can be an end group, as this term is defined hereinabove, wherein it is attached to a single adjacent atom, or a linking group, as this term is defined hereinabove, connecting two or more moieties at two or more positions thereof.

The term "heteroaryl" describes a monocyclic or fused ring (i.e., rings which share an adjacent pair of atoms) group having in the ring(s) one or more atoms, such as, for example, nitrogen, oxygen and sulfur and, in addition, having a completely conjugated pi-electron system. Examples, without limitation, of heteroaryl groups include pyrrole, furan, thiophene, imidazole, oxazole, thiazole, pyrazole, pyridine, pyrimidine, quinoline, isoquinoline and purine. The heteroaryl group may be substituted or unsubstituted. Substituted heteroaryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine. The heteroaryl group can be an end group, as this phrase is defined hereinabove, where it is attached to a single adjacent atom, or a linking group, as this phrase is defined hereinabove, connecting two or more moieties at two or more positions thereof. Representative examples are pyridine, pyrrole, oxazole, indole, purine and the like.

The term "halide" and "halo" describes fluorine, chlorine, bromine or iodine.

The term "haloalkyl" describes an alkyl group as defined above, further substituted by one or more halide.

The term "sulfate" describes a —O—S($=$O)$_2$—OR' end group, as this term is defined hereinabove, or an —O—S($=$O)$_2$—O— linking group, as these phrases are defined hereinabove, where R' is as defined hereinabove.

The term "thiosulfate" describes a —O—S($=$S)($=$O)—OR' end group or a —O—S($=$S)($=$O)—O— linking group, as these phrases are defined hereinabove, where R' is as defined hereinabove.

The term "sulfite" describes an —O—S($=$O)—O—R' end group or a —O—S($=$O)—O— group linking group, as these phrases are defined hereinabove, where R' is as defined hereinabove.

The term "thiosulfite" describes a —O—S($=$S)—O—R' end group or an —O—S($=$S)—O— group linking group, as these phrases are defined hereinabove, where R' is as defined hereinabove.

The term "sulfinate" describes a —S($=$O)—OR' end group or an —S($=$O)—O— group linking group, as these phrases are defined hereinabove, where R' is as defined hereinabove.

The term "sulfoxide" or "sulfinyl" describes a —S($=$O)R' end group or an —S($=$O)— linking group, as these phrases are defined hereinabove, where R' is as defined hereinabove.

The term "sulfonate" describes a —S($=$O)$_2$—R' end group or an —S($=$O)$_2$— linking group, as these phrases are defined hereinabove, where R' is as defined herein.

The term "S-sulfonamide" describes a —S($=$O)$_2$—NR'R" end group or a —S($=$O)$_2$—NR'— linking group, as these phrases are defined hereinabove, with R' and R" as defined herein.

The term "N-sulfonamide" describes an R'S($=$O)$_2$—NR"— end group or a —S($=$O)$_2$—NR'— linking group, as these phrases are defined hereinabove, where R' and R" are as defined herein.

The term "disulfide" refers to a —S—SR' end group or a —S—S— linking group, as these phrases are defined hereinabove, where R' is as defined herein.

The term "phosphonate" describes a —P(=O)(OR')(OR") end group or a —P(=O)(OR')(O)— linking group, as these phrases are defined hereinabove, with R' and R" as defined herein.

The term "thiophosphonate" describes a —P(=S)(OR')(OR") end group or a —P(=S)(OR')(O)— linking group, as these phrases are defined hereinabove, with R' and R" as defined herein.

The term "phosphinyl" describes a —PR'R" end group or a —PR'— linking group, as these phrases are defined hereinabove, with R' and R" as defined hereinabove.

The term "phosphine oxide" describes a —P(=O)(R')(R") end group or a —P(=O)(R')— linking group, as these phrases are defined hereinabove, with R' and R" as defined herein.

The term "phosphine sulfide" describes a —P(=S)(R')(R") end group or a —P(=S)(R')— linking group, as these phrases are defined hereinabove, with R' and R" as defined herein.

The term "phosphite" describes an —O—PR'(=O)(OR") end group or an —O—PH(=O)(O)— linking group, as these phrases are defined hereinabove, with R' and R" as defined herein.

The term "carbonyl" or "carbonate" as used herein, describes a —C(=O)—R' end group or a —C(=O)— linking group, as these phrases are defined hereinabove, with R' as defined herein.

The term "thiocarbonyl" as used herein, describes a —C(=S)—R' end group or a —C(=S)— linking group, as these phrases are defined hereinabove, with R' as defined herein.

The term "oxo" as used herein, describes a (=O) group, wherein an oxygen atom is linked by a double bond to the atom (e.g., carbon atom) at the indicated position.

The term "thiooxo" as used herein, describes a (=S) group, wherein a sulfur atom is linked by a double bond to the atom (e.g., carbon atom) at the indicated position.

The term "oxime" describes a =N—OH end group or a =N—O— linking group, as these phrases are defined hereinabove.

The term "hydroxyl" describes a —OH group.

The term "alkoxy" describes both an —O-alkyl and an —O-cycloalkyl group, as defined herein.

The term "aryloxy" describes both an —O-aryl and an —O-heteroaryl group, as defined herein.

The term "thiohydroxy" describes a —SH group.

The term "thioalkoxy" describes both a —S-alkyl group, and a —S-cycloalkyl group, as defined herein.

The term "thioaryloxy" describes both a —S-aryl and a —S-heteroaryl group, as defined herein.

The "hydroxyalkyl" is also referred to herein as "alcohol", and describes an alkyl, as defined herein, substituted by a hydroxy group.

The term "cyano" describes a —C≡N group.

The term "isocyanate" describes an —N=C=O group.

The term "isothiocyanate" describes an —N=C=S group.

The term "nitro" describes an —NO$_2$ group.

The term "acyl halide" describes a —(C=O)R"" group wherein R"" is halide, as defined hereinabove.

The term "azo" or "diazo" describes an —N=NR' end group or an —N=N— linking group, as these phrases are defined hereinabove, with R' as defined hereinabove.

The term "peroxo" describes an —O—OR' end group or an —O—O— linking group, as these phrases are defined hereinabove, with R' as defined hereinabove.

The term "carboxylate" as used herein encompasses C-carboxylate and O-carboxylate.

The term "C-carboxylate" describes a —C(=O)—OR' end group or a —C(=O)—O— linking group, as these phrases are defined hereinabove, where R' is as defined herein.

The term "O-carboxylate" describes a —OC(=O)R' end group or a —OC(=O)— linking group, as these phrases are defined hereinabove, where R' is as defined herein.

A carboxylate can be linear or cyclic. When cyclic, R' and the carbon atom are linked together to form a ring, in C-carboxylate, and this group is also referred to as lactone. Alternatively, R' and O are linked together to form a ring in O-carboxylate. Cyclic carboxylates can function as a linking group, for example, when an atom in the formed ring is linked to another group.

The term "thiocarboxylate" as used herein encompasses C-thiocarboxylate and O-thiocarboxylate.

The term "C-thiocarboxylate" describes a —C(=S)—OR' end group or a —C(=S)—O— linking group, as these phrases are defined hereinabove, where R' is as defined herein.

The term "O-thiocarboxylate" describes a —OC(=S)R' end group or a —OC(=S)— linking group, as these phrases are defined hereinabove, where R' is as defined herein.

A thiocarboxylate can be linear or cyclic. When cyclic, R' and the carbon atom are linked together to form a ring, in C-thiocarboxylate, and this group is also referred to as thiolactone. Alternatively, R' and O are linked together to form a ring in O-thiocarboxylate. Cyclic thiocarboxylates can function as a linking group, for example, when an atom in the formed ring is linked to another group.

The term "carbamate" as used herein encompasses N-carbamate and O-carbamate.

The term "N-carbamate" describes an R"OC(=O)—NR'— end group or a —OC(=O)—NR'— linking group, as these phrases are defined hereinabove, with R' and R" as defined herein.

The term "O-carbamate" describes an —OC(=O)—NR'R" end group or an —OC(=O)—NR'— linking group, as these phrases are defined hereinabove, with R' and R" as defined herein.

A carbamate can be linear or cyclic. When cyclic, R' and the carbon atom are linked together to form a ring, in O-carbamate. Alternatively, R' and O are linked together to form a ring in N-carbamate. Cyclic carbamates can function as a linking group, for example, when an atom in the formed ring is linked to another group.

The term "carbamate" as used herein encompasses N-carbamate and O-carbamate.

The term "thiocarbamate" as used herein encompasses N-thiocarbamate and O-thiocarbamate.

The term "O-thiocarbamate" describes a —OC(=S)—NR'R" end group or a —OC(=S)—NR'— linking group, as these phrases are defined hereinabove, with R' and R" as defined herein.

The term "N-thiocarbamate" describes an R"OC(=S)NR'— end group or a —OC(=S)NR'— linking group, as these phrases are defined hereinabove, with R' and R" as defined herein.

Thiocarbamates can be linear or cyclic, as described herein for carbamates.

The term "dithiocarbamate" as used herein encompasses S-dithiocarbamate and N-dithiocarbamate.

The term "S-dithiocarbamate" describes a —SC(=S)—NR'R" end group or a —SC(=S)NR'— linking group, as these phrases are defined hereinabove, with R' and R" as defined herein.

The term "N-dithiocarbamate" describes an R"SC(=S)NR'— end group or a —SC(=S)NR'— linking group, as these phrases are defined hereinabove, with R' and R" as defined herein.

The term "urea", which is also referred to herein as "ureido", describes a —NR'C(=O)—NR"R'" end group or a —NR'C(=O)—NR"— linking group, as these phrases are defined hereinabove, where R' and R" are as defined herein and R'" is as defined herein for R' and R".

The term "thiourea", which is also referred to herein as "thioureido", describes a —NR'—C(=S)—NR"R'" end group or a —NR'—C(=S)—NR"— linking group, with R', R" and R'" as defined herein.

The term "amide" as used herein encompasses C-amide and N-amide.

The term "C-amide" describes a —C(=O)—NR'R" end group or a —C(=O)—NR'— linking group, as these phrases are defined hereinabove, where R' and R" are as defined herein.

The term "N-amide" describes a R'C(=O)—NR"— end group or a R'C(=O)—N— linking group, as these phrases are defined hereinabove, where R' and R" are as defined herein.

An amide can be linear or cyclic. When cyclic, R' and the carbon atom are linked together to form a ring, in C-amide, and this group is also referred to as lactam. Cyclic amides can function as a linking group, for example, when an atom in the formed ring is linked to another group.

The term "guanyl" describes a R'R"NC(=N)— end group or a —R'NC(=N)— linking group, as these phrases are defined hereinabove, where R' and R" are as defined herein.

The term "guanidine" describes a —R'NC(=N)—NR"R'" end group or a —R'NC(=N)—NR"— linking group, as these phrases are defined hereinabove, where R', R" and R'" are as defined herein.

The term "hydrazine" describes a —NR'—NR"R'" end group or a —NR'—NR"— linking group, as these phrases are defined hereinabove, with R', R", and R'" as defined herein.

As used herein, the term "hydrazide" describes a —C(=O)—NR'—NR"R'" end group or a —C(=O)—NR'—NR"— linking group, as these phrases are defined hereinabove, where R', R" and R'" are as defined herein.

As used herein, the term "thiohydrazide" describes a —C(=S)—NR'—NR"R'" end group or a —C(=S)—NR'—NR"— linking group, as these phrases are defined hereinabove, where R', R" and R'" are as defined herein.

As used herein, the term "alkylene glycol" describes a —O—[(CR'R")$_z$—O]$_y$—R'" end group or a —O—[(CR'R")$_z$—O]$_y$— linking group, with R', R" and R'" being as defined herein, and with z being an integer of from 1 to 10, preferably, from 2 to 6, more preferably 2 or 3, and y being an integer of 1 or more. Preferably R' and R" are both hydrogen. When z is 2 and y is 1, this group is ethylene glycol. When z is 3 and y is 1, this group is propylene glycol. When y is 2-4, the alkylene glycol is referred to herein as oligo(alkylene glycol). When y is higher than 4, the alkylene glycol is referred to herein as poly(alkylene glycol).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Materials and Experimental Methods

Materials:

BMI-689 marketed by Designer Molecules Inc. was used in all experiments.

A solvent-containing BMI formulation (BMI-689/HA) was prepared by preparing 80 wt. % BMI-689, in n-Hexyl Acetate, 99% (Alfa Aesar) with the addition of free radical photoinitiators as follows: 2 wt. % of Irgacure 819 (BASF) and 1 wt. % Irgacure TPO-L (BASF).

Solvent-free BMI formulations (referred to herein also as BMI-689/RD) were prepared by admixing 80 wt. % BMI-689 with 20 wt. % a reactive diluent (RD; also referred to herein throughout as "curable material" or "additional curable material") with the addition of 1 phr (part per hundred resin) Irgacure TPO (BASF), a free radical photoinitiator, and BYK307 0.05 phr.

All other ingredients, including the tested curable materials, were obtained from known vendors.

Analytical Methods:

The viscosity of BMI-containing formulations was measured by Brookfield viscometer (model LVDVE).

The surface tension of the BMI solutions was measured by Kruss Tensiometer, model K-6, using the du Noüy ring method.

Tg (tan δ) and Storage Modulus (E') were measured using DMA (dynamic mechanical analysis) by Q-800 (TA Instruments). Measurements were done on a temperature ramp mode from room temperature to 180° C. at a heating rate of 5° C./min.

HDT was measured using a HDT 3 Vicat apparatus (Ceast) via ASTM D648.

Mold Preparation:

50-grams formulations of several BMI-689/RD samples were prepared in a 100 ml vessel, by adding BMI-689 (40 grams), a reactive diluent (10 grams) and a photoinitiator as described above. The mixtures were stirred at 60° C. for 30 minutes or till homogeneous mixtures are obtained.

The obtained formulations were thereafter poured into molds, and the molds were subjected to UV irradiation, using is a UV oven equipped with 10 UV lamps (Philips TL-K 40W actinic BL reflector), for a time period of 10-20 hours, to assure complete reaction.

The obtained models were removed from the molds and subjected to a gradient thermal post-treatment, heating consecutively for 1 hour at 150° C., 1 hour at 200° C. and 1 hour at 250° C., to avoid thermal shock.

The models were of a rectangular shape with dimensions of 3.2 mm×12 mm×125 mm for HDT measurements and of 3.2 mm×12 mm×64 mm for DMA measurements.

Printing:

The printing of 3D models was performed on Stratasys (Objet) Connex2 3D inkjet printer, equipped with E1 print heads and a thermoregulated printing tray, unless otherwise indicated. For solvent-containing BMI formulations (BMI-689/HA), an IR lamp Heater (P=500W, model T-HTS/2, Elstein) was added. The printing trials were performed in a single jetting mode, with layer thickness of about 28 μm.

Solvent-containing formulations were printed while performing scanning with 1 IR lamps, 8 scans after each printed slice, and while heating the printing tray to 90° C. during the printing. Cooling fans were turned off to help maintain a high temperature environment.

Solvent-free BMI-689 formulations were printed at standard conditions, without IR scans, with heating of the printing tray to 60° C. Cooling fans were used to maintain the temperature due to exothermic reaction.

The printed models were removed from the printer and subjected to a gradient thermal post-treatment, heating consecutively for 1 hour at 150° C., 1 hour at 200° C. and 1 hour at 250° C., to avoid thermal shock.

The models were of a rectangular shape with dimensions of 3.2 mm×12 mm×125 mm for HDT measurements and of 3.2 mm×12 mm×64 mm for DMA measurements.

Experimental Results

Tables 1 and 2 below present the data obtained for molds prepared while using pure BMI-869 and solvent-free formulations of BMI-869 including various reactive diluents (curable materials as defined herein).

The following monofunctional reactive diluents were used:
Dodecyl vinyl ether;
Hydroxybutyl vinyl ether;
Vinyl caprolactam;
Isobornylmethacrylate (IBOMA); and
Acryloyl morpholine (ACMO).

The following di-functional curable materials were tested:
Cyclohexanedimethanol divinyl ether (CHDVE)
Triethylenelycol divinyl ether (DVE-3)
Diethylenelycol divinyl ether (DVE-2)
Hexane-1,6-diol diacrylate (Marketed as SR238)
3-Methyl-1,5-pentanediol diacrylate (MPDA; marketed as SR341)
1,3-Butylene glycol dimethacrylate (BGDMA; marketed as SR297J)

TABLE 1

| Post-treatment | E' (MPa) Before | E' (MPa) After | $T(E'_{1/2})$ Before | $T(E'_{1/2})$ After | Tg(° C.) Before | Tg(° C.) After | HDT(° C.) Before | HDT(° C.) After |
|---|---|---|---|---|---|---|---|---|
| Pure BMI689 | 414 | 713 | 57 | 56 | RT | 77 | >157 | >157 |
| Monofunctional Vinyl Ether | | | | | | | | |
| vinyl ether | | | | | | | | |
| dodecyl vinyl ether | 385 | 495 | 55.8 | 57 | 72.7 | 104 | >157 | 46 |
| hydroxy butyl vinyl ether | 436 | 760 | 57 | 58.5 | 79 | 86 | 49.5 | 46.3 |
| Vinyl caprolactam | 843 | 903 | 65.7 | 55.5 | 120 | 75.2; 119 | 76.8 | 45.7 |
| Monofunctional (meth)Acrylate | | | | | | | | |
| IBOMA | 607 | 740 | 57 | 62 | 118 | 123 | 62.75 | 55.9 |
| ACMO | 511 | 857 | 54 | 64 | 108 | 125 | 65 | 71 |
| Difunctional Divinyl Ether | | | | | | | | |
| CHDVE | 590 | 802 | 61 | 64 | 105 | 106 | >157 | >157 |
| DVE-3 | 449 | 741 | 64.5 | 61.5 | 76 | 96 | >157 | 75 |
| DVE-2 | 537 | 887 | 59.7 | 61.5 | 74 | 103.3 | >157 | 1#75, 2#157 |
| Difunctional Di(meth)acrylate | | | | | | | | |
| SR238 | 435 | 857 | 58.5 | 60.5 | 87 | 109 | >157 | >157 |
| SR341 | 572 | 947 | 57 | 72 | 68 | 121 | 85.5 | >157 |
| SR297J | 873 | 927 | 74.5 | 77 | 100 | 130 | >157 | >157 |

TABLE 2

| | | Curable Material | E' (MPa)** | HDT (° C.)** |
|---|---|---|---|---|
| | | Pure BMI689 | 713 | >157 |
| Monofunctional | VE* | dodecyl vinyl ether | 495 | 46 |
| | | hydroxy butyl vinyl ether | 760 | 46.3 |
| | | Vinyl caprolactam | 903 | 45.7 |
| | Acr* | IBOMA | 740 | 55.9 |
| | | ACMO | 857 | 71 |
| Difunctional | VE* | CHDVE | 802 | >157 |
| | | DVE-3 | 741 | 75 |
| | | DVE-2 | 887 | >157 |
| | Acr* | SR238 | 857 | >157 |
| | | SR341 | 947 | >157 |
| | | SR297J | 927 | >157 |

*VE—Vinyl ether; Acr = (meth)acrylate
**Values are provided for molds subjected to thermal post-treatment as described hereinabove Additional Experiments in molds were performed using various concentrations of various photoinitiators, and demonstrated that the type and concentration of a photoinitiator do not affect substantially the properties of the obtained sample.

As can be clearly seen from the obtained data, adding a monofunctional reactive diluent adversely affected the properties, particularly the mechanical stability of the BMI, whereas the addition of difunctional reactive diluents resulted not only in maintaining the exceptional thermal stability of the BMI, as reflected by the high HDT values, but also improved the mechanical properties compared to those obtained while using BMI only (in a solvent-containing formulation).

As previously described, BMI cannot be used per se in 3D inkjet printing due to its extremely high viscosity. Hence, in experiments for manufacturing 3D-printed objects, a formulation containing BMI and a solvent (e.g., hexyl acetate) was used.

The formulations presented in Tables 1 and 2, on the other hand, exhibit a viscosity that is suitable for 3D inkjet printing. All the tested formulations feature a viscosity at the working temperature (70-80° C.) in the range of 16-20 centipoises.

Representative solvent-free formulations of BMI (BMI-689/RD) were tested in 3D inkjet printing and the properties of the obtained models were compared to those of models printed using a solvent-based formulation comprising a mixture of 80:20 BMI/Hexyl acetate (BMI-689/HA).

Tables 3 and 4 present the data obtained for the printed models obtained with the above formulations.

TABLE 3

| Post-treatment | E' (MPa) | | T(E'$_{1/2}$) | | Tg(° C.) | | HDT(° C.) | |
|---|---|---|---|---|---|---|---|---|
| | Before | After | Before | After | Before | After | Before | After |
| IBOMA | 767 | 490 | 47 | 67.5 | 89.5 | 96.4 | 60 | 54 |
| CHDVE | 505 | 1152 | N/A | N/A | 64 | 109 | >157 | >157 |

TABLE 4

| | E' (MPa) | Tg (° C.) | Printing time (min) |
|---|---|---|---|
| Solvent-based BMI<br>Hexyl Acetate - 20 wt. %<br>BMI 689 - 80 wt. % | 747 | 78 | 120-150 |
| Solvent-free BMI<br>CHDVE - 20 wt. %<br>BMI 689 - 80 wt. % | 1152 | 110 | ~20-25 |
| Solvent-free BMI<br>SR297J - 20 wt. %<br>BMI 689 - 80 wt. % | 1020 | 124 | ~20-25 |

As can be clearly seen, the solvent-based BMI formulation requires excessive printing time, since IR scans are required after each slice, for removing the solvent. Using exemplary formulations according to the present embodiments is performed without subjecting the dispensed layers to IR scanning, and thus printing time is substantially reduced, application of IR is not required, volume shrinkage due to solvent evaporation is avoided, handling of VOC (volatile organic content) is not required due to the solvent-free methodology, which is therefore more environmentally friendly.

Moreover, in addition to the process parameters, which are advantageous over those of solvent-containing BMI formulations, it can be clearly seen that the properties of the obtained models are further improved, presumably due to a more effective curing of each layer (compared to both mold preparations and solvent-containing formulations).

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A formulation comprising a polyimide precursor and a multifunctional photopolymerizable material, wherein said multifunctional photopolymerizable material is represented by Formula II:

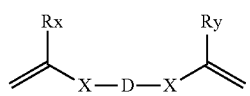

Formula II wherein:
X is selected from —O— and —O—C(=O)—;
D is a hydrocarbon chain; and
Rx and Ry are each independently selected from hydrogen, alkyl and cycloalkyl,
wherein a weight ratio of said polyimide precursor and said multifunctional photopolymerizable material in the formulation ranges from 50:50 to 90:10,
the formulation being devoid of an organic solvent and featuring a viscosity of from about 16 to about 20 centipoises at 70° C.

2. The formulation of claim 1, being devoid of a bis-allyl-nadi-imide compound.

3. The formulation of claim 1, wherein said polyimide precursor is bismaleimide.

4. The formulation of claim 1, wherein said polyimide precursor is represented by Formula I:

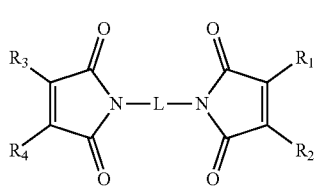

Formula I wherein:
L is a linking moiety; and
$R_1$-$R_4$ are each independently selected from hydrogen, alkyl and cycloalkyl.

5. The formulation of claim 1, wherein an amount of the multifunctional photopolymerizable material is less than 25 weight percent of the total weight of the formulation.

6. The formulation of claim 1, usable in additive manufacturing of a three-dimensional object which comprises, in at least a portion thereof, a polyimide-containing material, wherein said additive manufacturing is three-dimensional inkjet printing, the formulation being such that a layer formed thereby during said additive manufacturing undergoes curing within no more than 1 minute.

7. The formulation of claim 1, wherein said multifunctional photopolymerizable material features a viscosity at room temperature of less than 15 centipoises or less than 10 centipoises; and/or a flash point at least 10° C. higher than a temperature of applied to the formulation during the method.

8. A method of additive manufacturing of a three-dimensional object which comprises, in at least a portion thereof, a polyimide-containing material, the method comprising sequentially forming a plurality of layers in a configured pattern corresponding to the shape of the object, thereby forming the object,
wherein said formation of each of at least a few of said layers comprises dispensing a modeling material formulation which comprises a polyimide precursor and a multifunctional photopolymerizable material;
and exposing each of the dispensed layers to a curing condition to thereby form a cured modeling material comprising said polyimide-containing material,
and wherein:
said modeling material formulation which comprises said polyimide precursor is devoid of an organic solvent; and
said multifunctional photopolymerizable material is represented by Formula II:

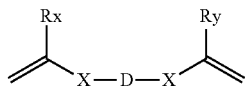

Formula II wherein:
X is selected from —O— and —O—C(=O)—;
D is a hydrocarbon chain; and
Rx and Ry are each independently selected from hydrogen, alkyl and cycloalkyl,
wherein a weight ratio of said polyimide precursor and said multifunctional photopolymerizable material in the formulation ranges from 50:50 to 90:10.

9. The method of claim 8, wherein said at least one modeling material formulation which comprises said polyimide precursor is devoid of a bis-allyl-nadi-imide compound.

10. The method of claim 8, wherein a viscosity of said modeling material formulation containing said polyimide precursor is from about 16 to about 20 centipoises at 70° C.

11. The method of claim 8, wherein said polyimide precursor is bismaleimide.

12. The method of claim 8, wherein an amount of said multifunctional photopolymerizable material in said modeling material formulation comprising said polyimide precursor is less than 25 weight percents of the total weight of said formulation.

13. The method of claim 8, wherein said multifunctional photopolymerizable material features at least one of:
a viscosity at room temperature of less than 15 centipoises or less than 10 centipoises; and
a flash point at least 10° C. higher than a temperature of applied to the formulation during the method.

14. The method of claim 8, further comprising subjecting the object to thermal treatment.

15. The method of claim 14, wherein said thermal treatment comprises exposing the object to heat for at least one hour at a temperature of at least 100° C.

* * * * *